United States Patent
Mohammad et al.

(10) Patent No.: US 12,322,387 B2
(45) Date of Patent: Jun. 3, 2025

(54) IN-VEHICLE VOICE COMMAND CONTROL

(71) Applicant: QUALCOMM Incorporated, San Diego, CA (US)

(72) Inventors: Asif Iqbal Mohammad, San Diego, CA (US); Sreekanth Narayanaswamy, San Diego, CA (US); Rishabh Tyagi, Hyderabad (IN); Erik Visser, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/747,631

(22) Filed: May 18, 2022

(65) Prior Publication Data

US 2022/0277744 A1 Sep. 1, 2022

Related U.S. Application Data

(63) Continuation of application No. 15/639,826, filed on Jun. 30, 2017, now abandoned.
(Continued)

(51) Int. Cl.
*B60R 16/037* (2006.01)
*G06F 3/16* (2006.01)
(Continued)

(52) U.S. Cl.
CPC .............. *G10L 15/22* (2013.01); *G06F 3/167* (2013.01); *G10K 11/178* (2013.01);
(Continued)

(58) Field of Classification Search
CPC . H04R 2499/13; B60R 16/0373; G10L 15/20; G10L 21/02
See application file for complete search history.

(56) References Cited

U.S. PATENT DOCUMENTS

| 5,222,148 A | 6/1993 | Yuan |
| 6,230,138 B1 | 5/2001 | Everhart |

(Continued)

FOREIGN PATENT DOCUMENTS

| CN | 103287362 | 9/2013 |
| CN | 105957523 | 9/2016 |

(Continued)

OTHER PUBLICATIONS

Iliev G., et al., "Adaptive System for Engine Noise Cancellation in Mobile Communications," Automatika 45, Sep. 6-10, 2004, pp. 137-143.
(Continued)

*Primary Examiner* — Bryan S Blankenagel
(74) *Attorney, Agent, or Firm* — QUALCOMM Incorporated; Espartaco Diaz Hidalgo

(57) ABSTRACT

A vehicle includes an interface device, an in-vehicle control unit, a functional unit, and a processing circuitry. The interface device receives a spoken command to identify an in-cabin vehicle zone of two or more in-cabin vehicle zones of the vehicle, and receives background audio data concurrently with a portion of the spoken command. The in-cabin vehicle control unit separates the background audio data from the spoken command, and selects which in-cabin vehicle zone of the two or more in-cabin vehicle zones is identified by the spoken command. The functional unit controls a function within the vehicle. The processing circuitry stores, to a command buffer, data processed from the received spoken command, and controls, based on the data processed from the received spoken command, the functional unit using audio input received from the selected in-cabin vehicle zone.

24 Claims, 15 Drawing Sheets

Related U.S. Application Data

(60) Provisional application No. 62/440,956, filed on Dec. 30, 2016.

(51) Int. Cl.

| | |
|---|---|
| *G10K 11/178* | (2006.01) |
| *G10L 15/20* | (2006.01) |
| *G10L 15/22* | (2006.01) |
| *G10L 21/02* | (2013.01) |
| *G10L 25/84* | (2013.01) |
| *H04R 1/40* | (2006.01) |
| *H04R 3/00* | (2006.01) |
| *G10L 21/0208* | (2013.01) |
| *H04R 29/00* | (2006.01) |

(52) U.S. Cl.
CPC .... *G10K 11/1785* (2018.01); *G10K 11/17881* (2018.01); *G10L 15/20* (2013.01); *G10L 21/02* (2013.01); *G10L 25/84* (2013.01); *H04R 1/406* (2013.01); *H04R 3/005* (2013.01); *B60R 16/0373* (2013.01); *G10K 2210/111* (2013.01); *G10K 2210/1282* (2013.01); *G10K 2210/3011* (2013.01); *G10K 2210/3044* (2013.01); *G10L 2015/223* (2013.01); *G10L 21/0208* (2013.01); *H04R 29/004* (2013.01); *H04R 2410/05* (2013.01); *H04R 2499/13* (2013.01)

(56) References Cited

U.S. PATENT DOCUMENTS

| | | | |
|---|---|---|---|
| 8,688,458 B2 | 4/2014 | Buck et al. | |
| 9,402,132 B2 | 7/2016 | Park et al. | |
| 9,672,805 B2 | 6/2017 | Kim et al. | |
| 9,743,213 B2 | 8/2017 | Mohammad et al. | |
| 2005/0049864 A1* | 3/2005 | Kaltenmeier | G10L 15/20 |
| | | | 704/E15.039 |
| 2005/0240324 A1 | 10/2005 | Boman et al. | |
| 2006/0262935 A1* | 11/2006 | Goose | H04S 3/002 |
| | | | 381/17 |
| 2007/0297619 A1 | 12/2007 | Pan | |
| 2008/0051946 A1 | 2/2008 | Breed | |
| 2008/0118080 A1 | 5/2008 | Gratke et al. | |
| 2008/0270131 A1 | 10/2008 | Fukuda et al. | |
| 2010/0098265 A1 | 4/2010 | Pan et al. | |
| 2011/0145000 A1 | 6/2011 | Hoepken et al. | |
| 2011/0251704 A1* | 10/2011 | Walsh | H04S 7/307 |
| | | | 700/94 |
| 2013/0096771 A1 | 4/2013 | Srenger | |
| 2013/0179163 A1* | 7/2013 | Herbig | G10L 21/0208 |
| | | | 381/86 |
| 2013/0304371 A1* | 11/2013 | Kitatani | H04R 5/04 |
| | | | 701/408 |
| 2015/0110287 A1* | 4/2015 | Holdren | G10L 15/22 |
| | | | 381/86 |
| 2015/0197136 A1 | 7/2015 | Chen et al. | |
| 2015/0248897 A1 | 9/2015 | Nakayama | |
| 2015/0288944 A1* | 10/2015 | Nistico | G06T 7/70 |
| | | | 345/156 |
| 2016/0012813 A1* | 1/2016 | Every | G10L 25/78 |
| | | | 381/66 |
| 2016/0150315 A1* | 5/2016 | Tzirkel-Hancock | H04R 3/005 |
| | | | 381/66 |
| 2016/0165031 A1 | 6/2016 | Gopinath et al. | |
| 2016/0171989 A1 | 6/2016 | Gupta et al. | |
| 2016/0173676 A1 | 6/2016 | Heo | |
| 2016/0176372 A1 | 6/2016 | Kim | |
| 2016/0221583 A1* | 8/2016 | Valeri | G10L 17/00 |
| 2016/0284337 A1 | 9/2016 | Inoue | |
| 2016/0371977 A1 | 12/2016 | Wingate et al. | |
| 2017/0032806 A1* | 2/2017 | Konjeti | G10K 11/17883 |
| 2017/0054949 A1 | 2/2017 | Shaw | |
| 2017/0213541 A1* | 7/2017 | MacNeille | G10K 11/17881 |
| 2018/0001899 A1 | 1/2018 | Shenoy et al. | |
| 2018/0190258 A1 | 7/2018 | Mohammad et al. | |
| 2018/0190282 A1 | 7/2018 | Mohammad et al. | |
| 2019/0066650 A1* | 2/2019 | Christoph | G10K 11/17825 |

FOREIGN PATENT DOCUMENTS

| | | | |
|---|---|---|---|
| DE | 102013013695 | 2/2015 | |
| DE | 102013016806 | 4/2015 | |
| EP | 1081682 A2 * | 3/2001 | ............ G10L 15/20 |
| JP | 2011240888 | 12/2011 | |
| WO | 2013153583 | 10/2013 | |

OTHER PUBLICATIONS

Prosecution History from U.S. Appl. No. 01/170,628, dated Oct. 11, 2018 through Mar. 18, 2022, 287 pp.

\* cited by examiner

IN-VEHICLE VOICE COMMAND CONTROL

This application is a continuation of application Ser. No. 15/639,826, filed Jun. 30, 2017, which claims the benefit of U.S. Provisional Application No. 62/440,956, filed Dec. 30, 2016, the entire contents of both which is incorporated by reference herein.

TECHNICAL FIELD

This disclosure relates to vehicle systems.

BACKGROUND

Vehicles are increasingly incorporating additional user experience-related features. Examples include climate control systems and entertainment systems, some of which are implemented at a per-passenger area or per-seat area level of granularity. Moreover, vehicles are increasingly incorporating voice-activated command capabilities. That is, vehicle occupants are gaining increasing ability to control various functional units of a vehicle by providing spoken commands. To implement voice-activation, vehicles are equipped with microphones that capture the spoken commands. Processing circuitry of the vehicle may extract command data from microphone-captured audio data, and uses the command data to control one or more functional units of the vehicle based on the occupant's spoken instruction.

SUMMARY

In general, the disclosure describes techniques for handoff of spoken command-based control between different occupants of a vehicle. Systems of this disclosure are configured to delineate between different in-cabin vehicle zones, such as in situations where the size of an individual in-cabin vehicle zone can be assumed to accommodate one occupant. The systems of this disclosure use commands received from individual in-cabin vehicle zones to detect scenarios in which voice control of a functional unit is to be assigned to a particular in-cabin vehicle zone. As one use case example, a vehicle's processing circuitry, configured according to aspects of this disclosure, may detect a command that passes voice control to a selected in-cabin vehicle zone, enabling an occupant of the selected in-cabin vehicle zone to provide spoken commands to operate climate control settings that are local to the selected in-cabin vehicle zone.

In one example, the disclosure describes a vehicle including an interface device configured to receive a spoken command to identify an in-cabin vehicle zone of two or more in-cabin vehicle zones of the vehicle and to receive background audio data concurrently with a portion of the spoken command. The vehicle further includes an in-cabin vehicle control unit, coupled to the interface device, the in-cabin vehicle control unit being configured to separate the background audio data from the spoken command and to select which in-cabin vehicle zone of the two or more in-cabin vehicle zones is identified by the spoken command. The vehicle further includes a functional unit, coupled to the in-cabin vehicle control unit, the functional unit being configured to control a function within the vehicle. The vehicle further includes processing circuitry coupled to the interface device, to the in-cabin vehicle control unit, and to the functional unit, and also includes a memory device that implements a command buffer. The processing circuitry is configured to store, to the command buffer, data processed from the received spoken command, and to control, based on the data processed from the received spoken command, the functional unit using audio input received from the selected in-cabin vehicle zone.

In one example, the disclosure describes a vehicle including an interface device configured to receive a tactile input to identify an in-cabin vehicle zone of two or more in-cabin vehicle zones of the vehicle, an in-cabin vehicle control unit, coupled to the interface device, the in-cabin vehicle control unit being configured to select which in-cabin vehicle zone of the two or more in-cabin vehicle zones is identified by the tactile input, and a functional unit, coupled to the in-cabin vehicle control unit, the functional unit being configured to control a function within the vehicle. The vehicle further includes processing circuitry coupled to the interface device, to the in-cabin vehicle control unit, and to the functional unit, and also includes a memory device that implements a command buffer. The processing circuitry is configured to store, to the command buffer, data processed from the received tactile input, and to control, based on the data processed from the received tactile input, the functional unit using audio input received from the selected in-cabin vehicle zone.

In one example, the disclosure describes a method that includes receiving, at an interface device of a vehicle, a spoken command to identify an in-cabin vehicle zone of two or more in-cabin vehicle zones of the vehicle, and receiving, at the interface device, background audio data concurrently with a portion of the spoken command. The method further includes separating, by an in-cabin vehicle control unit coupled to the interface device, the background audio data from the spoken command; and selecting, by an in-cabin vehicle control unit coupled to the interface device, which in-cabin vehicle zone of the two or more in-cabin vehicle zones is identified by the spoken command. The method further includes storing, to a memory device, by processing circuitry coupled to the interface device, to the in-cabin vehicle control unit, and to a functional unit of the vehicle, data processed from the received spoken command. The method further includes controlling, by the processing circuitry, based on the data processed from the received spoken command, the functional unit using audio input received from the selected in-cabin vehicle zone, and controlling, by the functional unit of the vehicle, a function within the vehicle.

In one example, the disclosure describes a method that includes receiving, at an interface device of a vehicle, a tactile input to identify an in-cabin vehicle zone of two or more in-cabin vehicle zones of the vehicle, and selecting, by an in-cabin vehicle control unit coupled to the interface device, which in-cabin vehicle zone of the two or more in-cabin vehicle zones is identified by the tactile input. The method further includes storing, to a memory device, by processing circuitry coupled to the interface device, to the in-cabin vehicle control unit, and to a functional unit of the vehicle, data processed from the received tactile input. The method further includes controlling, by the processing circuitry, based on the data processed from the received tactile input, the functional unit using audio input received from the selected in-cabin vehicle zone, and controlling, by the functional unit of the vehicle, a function within the vehicle.

In one example, the disclosure describes an apparatus that includes means for receiving, via an interface device, a spoken command to identify an in-cabin vehicle zone of two or more in-cabin vehicle zones of the vehicle, and means for receiving, via the interface device, background audio data concurrently with a portion of the spoken command. The apparatus further includes means for separating the background audio data from the spoken command, and means for selecting which in-cabin vehicle zone of the two or more in-cabin vehicle zones is identified by the spoken command. The apparatus further includes means for storing, to a memory device, data processed from the received spoken command, and means for controlling, based on the data processed from the received spoken command, a functional unit using audio input received from the selected in-cabin vehicle zone.

In one example, the disclosure describes an apparatus that includes means for receiving, via an interface device, a tactile input to identify an in-cabin vehicle zone of two or more in-cabin vehicle zones of the vehicle, and means for selecting which in-cabin vehicle zone of the two or more in-cabin vehicle zones is identified by the tactile input. The apparatus further includes means for storing, to a memory device, data processed from the received tactile input, and means for controlling, based on the data processed from the received tactile input, a functional unit using audio input received from the selected in-cabin vehicle zone.

In one example, the disclosure describes a computer-readable storage medium encoded with instructions. The instructions, when executed, cause processing circuitry of a vehicle to receive, via an interface device of the vehicle, a spoken command to identify an in-cabin vehicle zone of two or more in-cabin vehicle zones of the vehicle, to receive, via the interface device, background audio data concurrently with a portion of the spoken command, to separate the background audio data from the spoken command select which in-cabin vehicle zone of the two or more in-cabin vehicle zones is identified by the spoken command, to store data processed from the received spoken command, to control, based on the data processed from the received spoken command, the functional unit using audio input received from the selected in-cabin vehicle zone, and to cause the functional unit of the vehicle to a function within the vehicle.

In one example, the disclosure describes a computer-readable storage medium encoded with instructions. The instructions, when executed, cause processing circuitry of a vehicle to receive, via an interface device of the vehicle, a tactile input to identify an in-cabin vehicle zone of two or more in-cabin vehicle zones of the vehicle, to select which in-cabin vehicle zone of the two or more in-cabin vehicle zones is identified by the tactile input, to store data processed from the received tactile input, to control, based on the data processed from the received tactile input, the functional unit using audio input received from the selected in-cabin vehicle zone, and to cause the functional unit of the vehicle to a function within the vehicle.

The details of one or more examples are set forth in the accompanying drawings and the description below. Other features, objects, and advantages will be apparent from the description, drawings, and claims.

DETAILED DESCRIPTION

Figure 1:
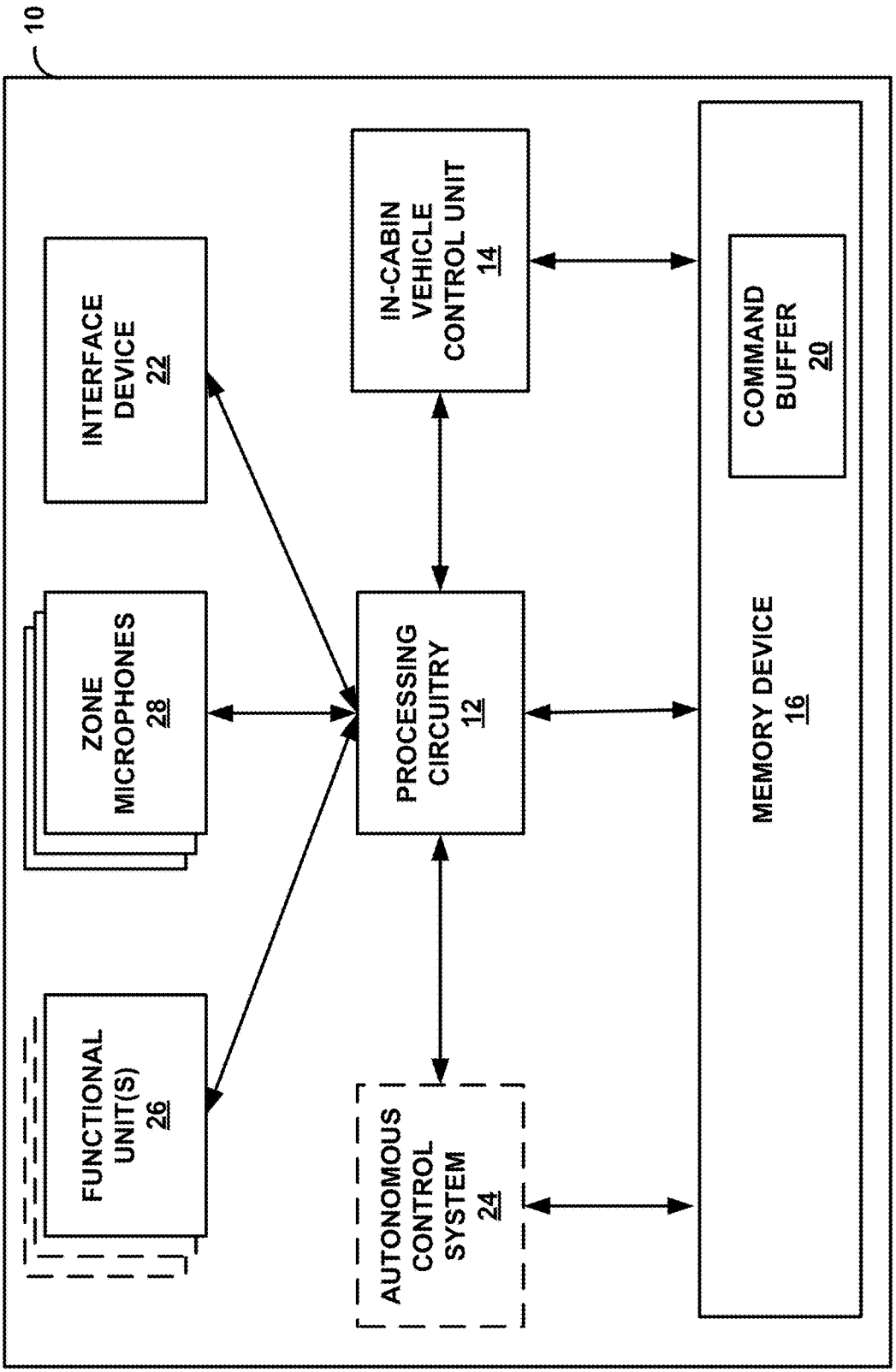
FIG. 1 is a block diagram illustrating a conceptual rendering of an example vehicle configured to perform various aspects of the functional unit control assignment techniques described in this disclosure.

With the increasing prevalence of finer granularity (e.g., per-passenger area or per-seat area) control of functional units in commercially-available vehicles, each occupant of a single vehicle may have the capability to provide individual parameters and commands for local functional unit control. Moreover, with the increasing ability to deploy microphones throughout the cabin of a vehicle, each occupant may be provided the ability to provide spoken commands to operate at—large functional unit parameters with respect to the cabin or the vehicle.

Examples of at—large, or cabin-wide or vehicle-wide functional unit parameters include, but are not limited to, all-cabin climate control settings, or a selected audio feed that is played back over the vehicles entertainment or infotainment system. Examples of local functional unit parameters include local climate control settings that target a single seat area, or a video feed that is played back via a local entertainment system or infotainment system positioned within or in front of a single occupant's seating area. Also, with the increasing deployment of autonomous vehicle technology, vehicle occupants are gaining more freedom to avail of user experience-oriented functional units of the vehicles, as the burden of driving-related decisions is alleviated as a result of increasing autonomous control by the vehicle itself.

Techniques of this disclosure and systems manufactured and/or configured according to aspects of this disclosure are directed to assigning audio-based control of functional units of a vehicle to a particular in-cabin vehicle zone. For instance, each in-cabin vehicle zone of the vehicle may correspond to a seating area that accommodates, as one example, a single occupant. Each in-cabin vehicle zone may be associated with a single microphone system. That is, a vehicle or a vehicle control system of this disclosure may identify a selected in-cabin vehicle zone, and control one or more functional units using audio input received from the selected in-cabin vehicle zone. For instance, the vehicle control system may control the functional unit(s) using spoken commands received at a microphone system that is positioned within, or otherwise assigned to, the selected in-cabin vehicle zone.

Various aspects of the technologies set forth in this disclosure may facilitate each individual occupant's ability to control functional units of the vehicle, whether on a localized or cabin-wide basis, while not interfering with the remaining functional aspects of the vehicle. In this way, aspects of this disclosure provide vehicle improvements that enhance the usability of and user experience provided by the vehicles. Various examples illustrated in the accompanying drawings and discussed below are directed to autonomous vehicles, semi-autonomous vehicles, and vehicles that are reliant on human input for driving functionalities. As such, it will be appreciated that the techniques of this disclosure are applicable to vehicles of varying levels of driving autonomy.

FIG. 1 is a block diagram illustrating a conceptual rendering of an example vehicle 10 configured to perform various aspects of the functional unit control assignment techniques described in this disclosure. Vehicle 10 is assumed in the description below to be an automobile. However, the techniques described in this disclosure may apply to any type of vehicle capable of conveying occupant (s) in a cabin, such as a bus, a recreational vehicle (RV), a semi-trailer truck, a tractor or other type of farm equipment, a train car, a plane, a personal transport vehicle, and the like.

In the example of FIG. 1, the vehicle 10 includes processing circuitry 12, an in-cabin vehicle control unit 14, and a memory device 16. In some examples, the processing circuitry 12 and the in-cabin vehicle control unit 14 may be formed as an integrated circuit (IC). For example, the IC may be considered as a processing chip within a chip package, and may be a system-on-chip (SoC). As illustrated in FIG. 1, the vehicle 10 may also optionally include an autonomous control system 24. The optional nature of autonomous control system 24 is shown by way of dashed-line borders, and in different implementations, autonomous control 24 may implement different levels of autonomy with respect to the driving capabilities of vehicle 10

Examples of the processing circuitry 12 and the in-cabin vehicle control unit 14 include, but are not limited to, one or more digital signal processors (DSPs), general purpose microprocessors, application specific integrated circuits (ASIC s), field programmable logic arrays (FPGAs), fixed function circuitry, programmable processing circuitry, any combination of fixed function and programmable processing circuitry, or other equivalent integrated circuitry or discrete logic circuitry. Processing circuitry 12 may be the central processing unit (CPU) of the vehicle 10. In some examples, the in-cabin vehicle control unit 14 may be specialized hardware that includes integrated and/or discrete logic circuitry that provides the in-cabin vehicle control unit 14 with parallel processing capabilities.

Processing circuitry 12 may execute various types of applications, such as various occupant experience related applications including climate control interfacing applications, entertainment and/or infotainment applications, cellular phone interfaces (e.g., as implemented using Bluetooth® links), stock trackers, vehicle functionality interfacing applications, web or directory browsers, or other applications that enhance the occupant experience within the confines of the vehicle 10. The memory device 16 may store instructions for execution of the one or more applications. As shown, memory device 16 implements a command buffer 20. The processing circuitry 12 may store command information to the command buffer 20.

Memory device 16 may include, be, or be part of the total memory for vehicle 10. The memory device 16 may comprise one or more computer-readable storage media. Examples of the memory device 16 include, but are not limited to, a random access memory (RAM), an electrically erasable programmable read-only memory (EEPROM), flash memory, or other medium that can be used to carry or store desired program code in the form of instructions and/or data structures and that can be accessed by a computer or one or more processors.

In some aspects, the memory device 16 may include instructions that cause the processing circuitry 12 to perform the functions ascribed in this disclosure to processing circuitry 12. Accordingly, the memory device 16 may be a computer-readable storage medium having instructions stored thereon that, when executed, cause one or more processors (e.g., the processing circuitry 12) to perform various functions.

Memory device 16 is a non-transitory storage medium. The term "non-transitory" indicates that the storage medium is not embodied in a carrier wave or a propagated signal. However, the term "non-transitory" should not be interpreted to mean that the memory device 16 is non-movable or that its contents are static. As one example, memory device 16 may be removed from vehicle 10, and moved to another device. As another example, memory, substantially similar to memory device 16, may be inserted into one or more receiving ports of the vehicle 10. In certain examples, a non-transitory storage medium may store data that can, over time, change (e.g., in RAM).

In some examples, one or more of the processing circuitry 12, the in-cabin vehicle control unit 14, or the memory device 16, or various portions/components thereof, may be implemented in pluggable form. That is, processing circuitry 12, the in-cabin vehicle control unit 14, or the memory device 16, or various portions/components thereof may be portable, and interfaceable with different vehicles. For instance, if an owner of the vehicle 10 switches vehicles, the owner may port some or all functionalities (e.g., user-set parameters, etc.) to a new vehicle, by plugging processing circuitry 12, the in-cabin vehicle control unit 14, or the memory device 16, or various portions/components thereof, into an interface or otherwise transferring processing circuitry 12, the in-cabin vehicle control unit 14, or the memory device 16, or various portions/components thereof to a different vehicle.

As further shown in the example of FIG. 1, the vehicle 10 may include an interface device 22, multiple zone microphones 28, and one or more functional units 26. In some examples, interface device may include one or more microphones that are configured to capture audio data of spoken commands provided by occupants of vehicle 10. For instance, the interface device 22 may overlap with the zone microphones 28, to the extent that the interface device 22 includes a driver zone microphone or pilot zone microphone or other microphones positioned in various in-cabin vehicle zones of vehicle 10. In some examples, interface device may include an interactive input/output display device, such as a touchscreen. For instance, display devices that can form a portion of the interface device 22 may represent any type of passive screen on which images can be projected, or an active screen capable of projecting images (such as a light emitting diode (LED) display, an organic LED (OLED) display, liquid crystal display (LCD), or any other type of active display), with input-receiving capabilities built in. Although shown as a single device in FIG. 1 for ease of illustration, the interface device 22 may include multiple user-facing devices that are configured to receive input and/or provide output. In various examples, the interface device 22 may include displays in wired or wireless communication with vehicle 10, such as a heads-up display, a head-mounted display, an augmented reality computing device (such as "smart glasses"), a virtual reality computing device or display, a laptop computer or netbook, a mobile phone (including a so-called "smartphone"), a tablet computer, a gaming system, or another type of computing device capable of acting as an extension of or in place of a display integrated into the vehicle 10.

In examples where the interface device 22 includes a microphone or microphone array, the interface device 22 may represent a data-input component or a combination of data-input components configured to capture audio data or a combination of audio data and directional information (such as an EigenMike® microphone or portions of an EigenMike® microphone). In examples where the interface device incorporates a microphone array, the microphone array may be configured to perform audio beamforming within the cabin of the vehicle 10. In some examples, at least one microphone of such a microphone array of the interface device 22 is located in the driver zone, the front passenger zone, or in an area associated with both the driver zone and the front passenger zone. Thus, the interface 22 may, in various implementations, represent a device or grouping of devices that can receive and relay various types of user input, such as tactile input, or spoken commands, or a combination of tactile input and spoken commands.

The interface device 22 may represent any type of physical or virtual interface with which a user may interface to control various functionalities of the vehicle 10. The interface device 22 may include physical buttons, knobs, sliders or other physical control implements. Interface device 22 may also include a virtual interface whereby an occupant of vehicle 10 interacts with virtual buttons, knobs, sliders or other virtual interface elements via, as one example, a touch-sensitive screen. Occupant(s) may interface with the interface device 22 to control one or more of a climate within vehicle 10, audio playback by vehicle 10, video playback by the vehicle 10, transmissions (such as cellphone calls) through the vehicle 10, or any other operation capable of being performed by vehicle 10.

The interface device 22 may also represent interfaces extended from the vehicle 10 when acting as an extension of or in place of a display integrated into the vehicle 10. That is, the interface device 22 may include virtual interfaces presented via the above noted HUD, augmented reality computing device, virtual reality computing device or display, tablet computer, or any other of the different types of extended displays listed above. As shown in FIG. 1, each of the interface device 22, the functional unit(s) 26, and the zone microphones 28 may be connected indirectly to the in-cabin vehicle control unit 14, and to the memory device 16. In other examples, each of the interface device 22, the functional unit(s) 26, and the zone microphones 28 may be connected directly to one or both of the in-cabin vehicle control unit 14, and to the memory device 16.

The vehicle 10 may include a steering wheel for controlling a direction of travel of the vehicle 10, one or more pedals for controlling a rate of travel of vehicle 10, one or more hand brakes, etc. In some examples, the steering wheel and pedals may be included in a particular in-cabin vehicle zone of the vehicle 10, such as in the driver zone or pilot zone.

In examples where the vehicle 10 includes the autonomous control system 24, the autonomous control system 24 may include various sensors and units, such as a global positioning system (GPS) unit, one or more accelerometer units, one or more gyroscope units, one or more compass units, one or more radar units, one or more LiDaR (which refers to a Light Detection and Ranging) units, one or more cameras, one or more sensors for measuring various aspects of the vehicle 10 (such as a steering wheel torque sensor, steering wheel grip sensor, one or more pedal sensors, tire sensors, tire pressure sensors), and any other type of sensor or unit that may assist in autonomous operation of vehicle 10. In this respect, the autonomous control system 24 may control operation of the vehicle 10 allowing the occupant to participate in tasks unrelated to the operation of the vehicle 10.

The zone microphones 28 of the vehicle 10 may represent a microphone array, with at least one microphone positioned in each in-cabin vehicle zone of a cabin of the vehicle 10, where each in-cabin vehicle zone represents an area that typically seats or otherwise accommodates a single occupant. Each of the zone microphones 28 may represent a data-input component or a combination of data-input components configured to capture audio data or a combination of audio data and directional information (such as an EigenMike® microphone).

Although described as providing one of the microphones 28 in each zone, the techniques may also be performed using fewer or more of the microphones 28 per zone. In some examples, the microphones 28 may not be located in each zone. Instead, the microphones 28 may be arranged such that beamforming or other techniques may be implemented to capture audio data emanating from a particular location or range of locations (defined, for example, by a range of azimuth, elevation or combination of azimuth and elevation angles). When centrally located and configured to perform beamforming, the microphones 28 may be considered as a "zone microphone" in the sense that the microphones 28 may focus capture of audio data from a specific zone within the vehicle 10.

In accordance with various aspects of this disclosure, at the time that the in-cabin vehicle control unit 14 is initialized in the vehicle 10, and/or at a time that the processing circuitry 12 is newly configured to perform control assignment with respect to the in-cabin zones of the vehicle 10, the processing circuitry 12 may run a calibration process or subroutine. By running the calibration process of this disclosure, the processing circuitry 12 may implement machine-learning with respect to two categories of data. Namely, the two categories of data with respect to which the processing circuitry 12 may implement machine-learning are (i) a coupling delay between a received signal and a corresponding transmitted signal at the interface device 22, and (ii) directionality information of one or more speakers (e.g., loudspeakers) that are used for audio playback within the cabin of the vehicle 10.

To implement the calibration aspects of this disclosure with respect to the coupling delay, the processing circuitry 12 may measure a length of time that elapses between a recorded far-end reference signal and a near-end signal received via one of the zone microphones 28. In turn, the processing circuitry 12 may assign the elapsed time value as an "acoustic delay" with respect to the respective zone microphone 28, and store the acoustic delay value offline, such as to the memory device 16. In some examples, the processing circuitry 12 may implement online learning of the acoustic delay by using filter coefficients associated with the near-end microphone signal. Additionally, the processing circuitry 12 may use the filter coefficients to verify that an impulse is manifested or observed in a second tap of sub-band adaptive filter coefficients. For instance, the processing circuitry 12 may adjust the acoustic delay parameter in order to verify that the impulse is observed in the second tap of the sub-band adaptive filter coefficients.

To perform the implement the calibration aspects of this disclosure with respect to the directionality information of the speakers positioned for audio playback within the cabin of the vehicle 10, the processing circuitry 12 may perform a series of steps. As a first step, the processing circuitry 12 may detect an echo via the respective zone microphone 28. For instance, each speaker may potentially contribute towards the echo at the respective microphone 28. As such, the signal played by each in-cabin speaker may go through a unique acoustic path before creating an echo at the respective microphone 28.

As a second step of the directionality information calibration techniques, the processing circuitry 12 may implement machine-learning of the acoustic paths from each of the in-cabin speakers using the calibration mode. For example, the processing circuitry 12 may cause the in-cabin speakers, one by one, to output white noise. In this way, the processing circuitry 12 may sequentially record speaker-by-speaker reference signals, to detect a speaker-by-speaker echo at the respective zone microphone 28.

As a third step of the directionality information calibration techniques, the processing circuitry 12 may use the white noise recordings offline. For instance, the processing circuitry 12 may use a special batch file to generate all of the calibration coefficients with respect to each white noise recording at the respective zone microphone 28. As a fourth step of the directionality information calibration techniques of this disclosure, the processing circuitry 12 may store the generated calibration coefficients to the memory device 16.

In turn, the processing circuitry 12 may use the stored calibration coefficients to dynamically create a mono-far-end reference signal, such as by mixing the individual surround signals using the learned acoustic paths from the calibration mode. The processing circuitry 12 may further use the generated mono-far-end reference signal and the corresponding microphone signal (with the appropriate delay added) to run echo cancellation and cancel the surround echo.

One or more functional units 26 may represent components of the vehicle 10 that, in some way, affect the user experience of one or more occupants of the vehicle 10. As examples, the functional units 26 may include climate control hardware (e.g., cabin-wide and/or localized climate control hardware), infotainment hardware (e.g., cabin-wide and/or localized infotainment hardware), and various other hardware components that are operable via spoken commands.

As such, in one example, the vehicle 10 may represent a vehicle comprising an interface device 22 configured to receive a spoken command to identify an in-cabin vehicle zone of two or more in-cabin vehicle zones of the vehicle 10 and to receive background audio data concurrently with a portion of the spoken command. The vehicle 10 also includes an in-cabin vehicle control unit 14, coupled to the interface device 22, and being configured to separate the background audio data from the spoken command, and to select which in-cabin vehicle zone of the two or more in-cabin vehicle zones is identified by the spoken command. The vehicle 10 may also include one or more functional units 26, coupled to the in-cabin vehicle control unit 14, and being configured to control a function within the vehicle 10. Vehicle 10 also includes processing 12 coupled to the interface device 22, to the in-cabin vehicle control unit 14, and to the functional unit(s) 26. Processing circuitry 12 is configured to store, to the command buffer 20, data processed from a received spoken command, and to control, based on the data processed from the received spoken command, the functional unit(s) 26 using audio input received from the selected in-cabin vehicle zone (e.g., via a respective one of zone microphones 28). The vehicle 10 also includes a memory device 16 that includes the command buffer 20.

Vehicle 10 represents an example of an apparatus that includes means for receiving, via an interface device, a spoken command to identify an in-cabin vehicle zone of two or more in-cabin vehicle zones of the vehicle, and means for receiving, via the interface device, background audio data concurrently with a portion of the spoken command. In this example, the apparatus further includes means for separating the background audio data from the spoken command, and means for selecting which in-cabin vehicle zone of the two or more in-cabin vehicle zones is identified by the spoken command. In this example, the apparatus further includes means for storing, to a memory device, data processed from the received spoken command, and means for controlling, based on the data processed from the received spoken command, a functional unit using audio input received from the selected in-cabin vehicle zone.

For instance, to separate the background audio data from the spoken command, the processing circuitry 12 may linearly remove the background audio data from the spoken command. For instance, the processing circuitry 12 may implement beamforming to determine the directionality of audio data received from various speakers positioned within the cabin of the vehicle 10, and may leverage the directionality information to identify the background audio data when received concurrently with the spoken command. In turn, the processing circuitry 12 may linearly remove the background audio data from the spoken command, based on the directional information observed with respect to the background audio data.

Figure 2A:
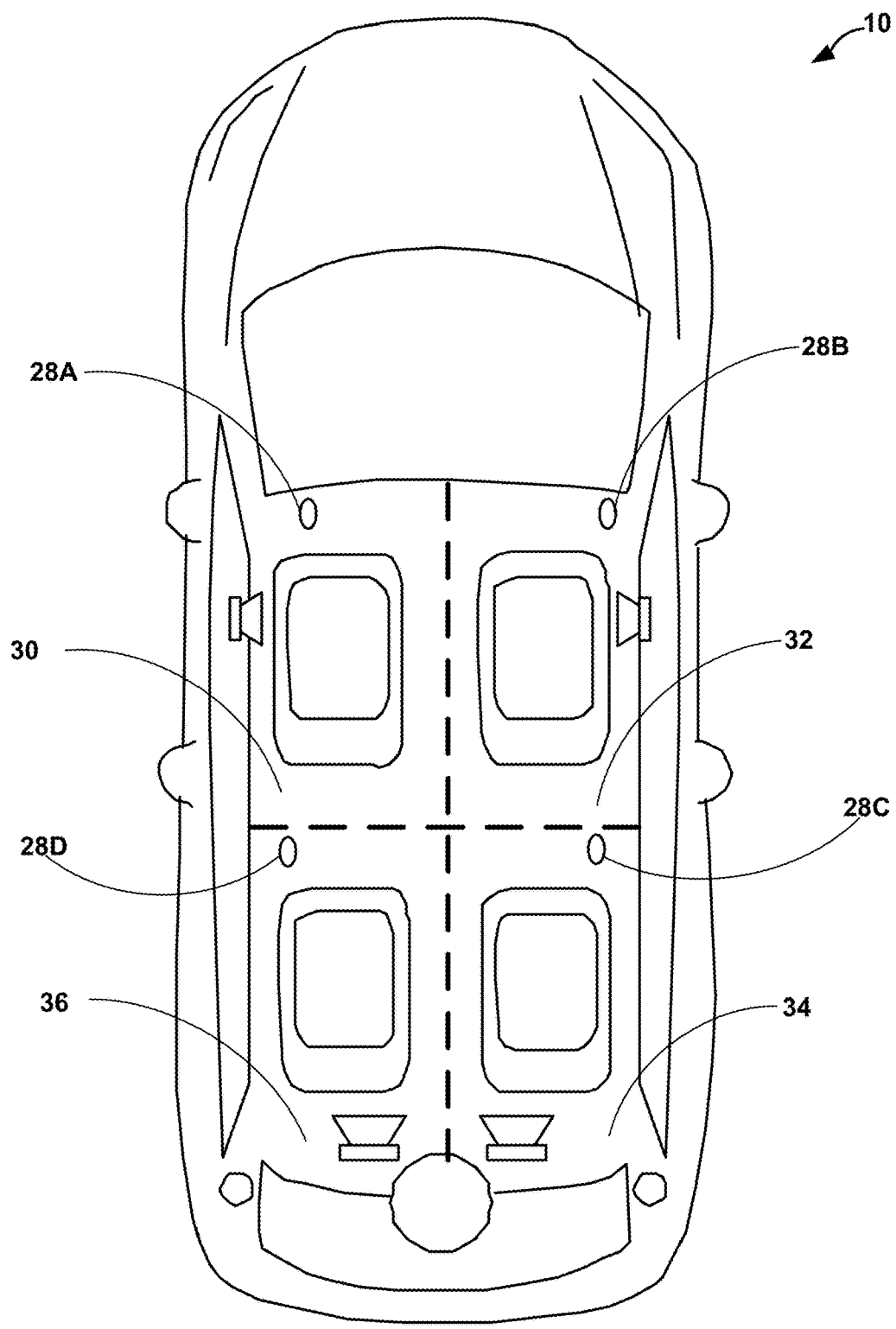
FIGS. 2A-2E are conceptual diagrams illustrating overhead views of respective examples of vehicles configured to perform various aspects of the techniques of this disclosure.

FIGS. 2A-2E are conceptual diagrams illustrating overhead views of respective examples of the vehicle 10 configured to perform various aspects of the techniques of this disclosure. FIG. 2A is a diagram illustrating an overhead view of an example of the vehicle 10 configured to perform various aspects of the techniques described in this disclosure. In the example of FIG. 2A, the vehicle 10 is divided into four in-cabin vehicle zones 32-36. Individually, the four in-cabin vehicle zones 30-36 include a driver zone 30, a front passenger zone 32, a back-right zone 34, and a back-left zone 36. It will be appreciated that in different configurations of the vehicle 10, the cabin of the vehicle 10 may be divided into a different number of in-cabin vehicle zones, and that the four in-cabin vehicle zone schematic illustrated in FIG. 2A is just one non-limiting example, with respect to the spoken command-based control assignment techniques of this disclosure. Each of the in-cabin vehicle zones 30-36 includes a respective loudspeaker in FIGS. 2A-2E. the loudspeakers are not called out with reference numerals in FIGS. 2A-2E for ease of illustration purposes only. In various examples, the loudspeaker arrangement may vary, and the number of loudspeakers, whether or a per-zone basis or on a cabin-wide basis, may vary, in accordance with various aspects of this disclosure.

According to the techniques of this disclosure, the processing circuitry 12 may enable the occupant of the driver zone 30 to assign voice control to any occupant of the vehicle 10. For instance, the occupant of the driver zone 30 may assign voice control to a particular one of the in-cabin vehicle zones 30-36 by way of a spoken command provided via the respective zone microphone 28 that is associated with the driver zone 30. In some examples, the occupant of the driver zone 30 or the occupant of the front passenger zone 32 by providing a touch input via a touchscreen, such as a touchscreen with which the vehicle 10 is equipped, to provide occupants control of an infotainment unit, climate control settings, or other units of functional unit(s) 26.

Upon the voice control being assigned to a particular one of the in-cabin vehicle zones 30-36, the respective passenger/occupant can operate one or more of the functional unit(s) 26 by speaking one or more keywords that the processing circuitry 12 has been configured to interpret with respect to generating instructions for the operation of the functional unit(s) 26. In some examples, the occupant of the respective one of the in-cabin vehicle zones 30-36 that has voice control (also referred to as a currently "active" in-cabin vehicle zone) may reassign voice control to one of in-cabin vehicle zones 30-36. With respect to operating the functional unit(s) 26, the processing circuitry 12 may process voice queries or voice commands to play certain music, change air conditioning, heat, or other climate control settings, place a call using a cellular phone that is paired to the processing circuitry 12, etc.

In some examples, the processing circuitry 12 may control the functional unit(s) 26 using spoken commands received from the zone microphones 28 of multiple zones of the in-cabin vehicle zones 30-36. As one example, the processing circuitry may control the functional unit(s) 26 using spoken commands received at the zone microphone 28A of the driver zone 30 at all times, in addition to spoken commands received at any of zone microphones 28 that is positioned in an active zone of in-cabin vehicle zones 32-36.

At various portions of this disclosure, the implementation described above may be described as the processing circuitry being configured to "simultaneously" or "concurrently" control the functional unit(s) 26 using the respective zone microphones 28 of multiple zones of the in-cabin vehicle zones 30-36. It will be appreciated that the use of the terms "simultaneous" or "concurrent" is not limited to scenarios in which the spoken commands from multiple zones overlap in time, but also include scenarios in which the processing circuitry 12 receives the spoken commands from the multiple zones during a discrete, fixed, window of time.

Figure 2B:
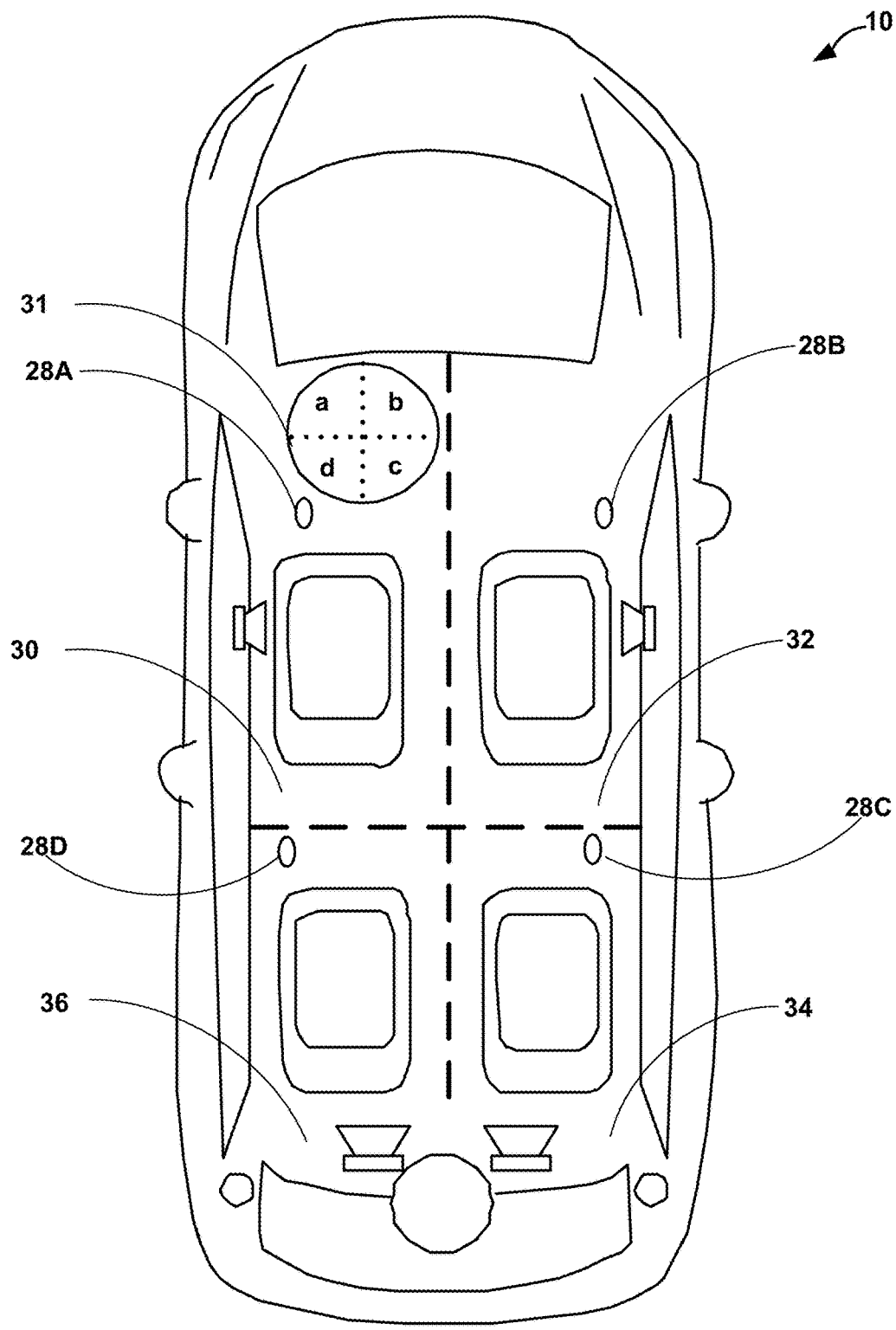

FIG. 2B illustrates the vehicle 10, in an implementation in which the in-cabin vehicle zone selection may be performed via a tactile input. In the example of FIG. 2B, the cabin of the vehicle 10 includes a graphical user interface (GUI) 31. The processing circuitry 12 may output the GUI 31 via a touchscreen, such as a touchscreen via which one or more occupants of the vehicle 10 operate an infotainment system of the vehicle 60. In the particular example of FIG. 2B, the GUI 31 is illustrated as being output by an interface within the driver zone 30. It will be appreciated that in different examples, the GUI 31 may be output in another one of in-cabin vehicle zones 30-36, in a general area that occupies space in multiple zones of in-cabin vehicle zones 30-36, or in a general area that is not included in any in-cabin vehicle zones 30-36, but is visible and/or accessible to the occupants of one or more of these zones.

In the particular example of FIG. 2B, the GUI 31 is a circular GUI, split into quadrants. For instance, each of quadrants a-d of the GUI 31 may correspond to one of the in-cabin vehicle zones 30-36. In one example, an occupant of the driver zone 30 may select the back-right zone 34 by providing a tactile input (e.g., a touch or tap gesture) at an area of the touchscreen that corresponds to quadrant 'c' of the GUI 31.

In this way, the vehicle 10 is an example of a vehicle including an interface device 22 (e.g., a touchscreen) configured to receive a tactile input to identify an in-cabin vehicle zone of two or more in-cabin vehicle zones (30-36) of the vehicle 10, an in-cabin vehicle control unit 14, coupled to the interface device 22, the in-cabin vehicle control unit 14 being configured to select which in-cabin vehicle zone of the two or more in-cabin vehicle zones 30-36 is identified by the tactile input, and one or more functional unit(s) 26, coupled to the in-cabin vehicle control unit 14, the functional unit(s) 26 being configured to control a function within the vehicle 10. The example of the vehicle 10 illustrated in FIG. 2B also comprises the processing circuitry 12, coupled to the interface device 22, to the in-cabin vehicle control unit 14, and to the functional unit(s) 26. In the example of FIG. 2B, the processing circuitry 12 is configured to store, to the command buffer 20, data processed from the received tactile input (e.g., received via a tap at the GUI 31), to control, based on the data processed from the received tactile input, the functional unit(s) 26 using audio input received from the selected in-cabin vehicle zone of the in-cabin vehicle zones 30-36. The vehicle 10 also includes the memory device 16 that implements the command buffer 20.

Vehicle 10 thus represents an example of an apparatus that includes means for receiving, via an interface device, a tactile input to identify an in-cabin vehicle zone of two or more in-cabin vehicle zones of the vehicle, and means for selecting which in-cabin vehicle zone of the two or more in-cabin vehicle zones is identified by the tactile input. In this example, the apparatus further includes means for storing, to a memory device, data processed from the received tactile input, and means for controlling, based on the data processed from the received tactile input, a functional unit using audio input received from the selected in-cabin vehicle zone.

Figure 2C:
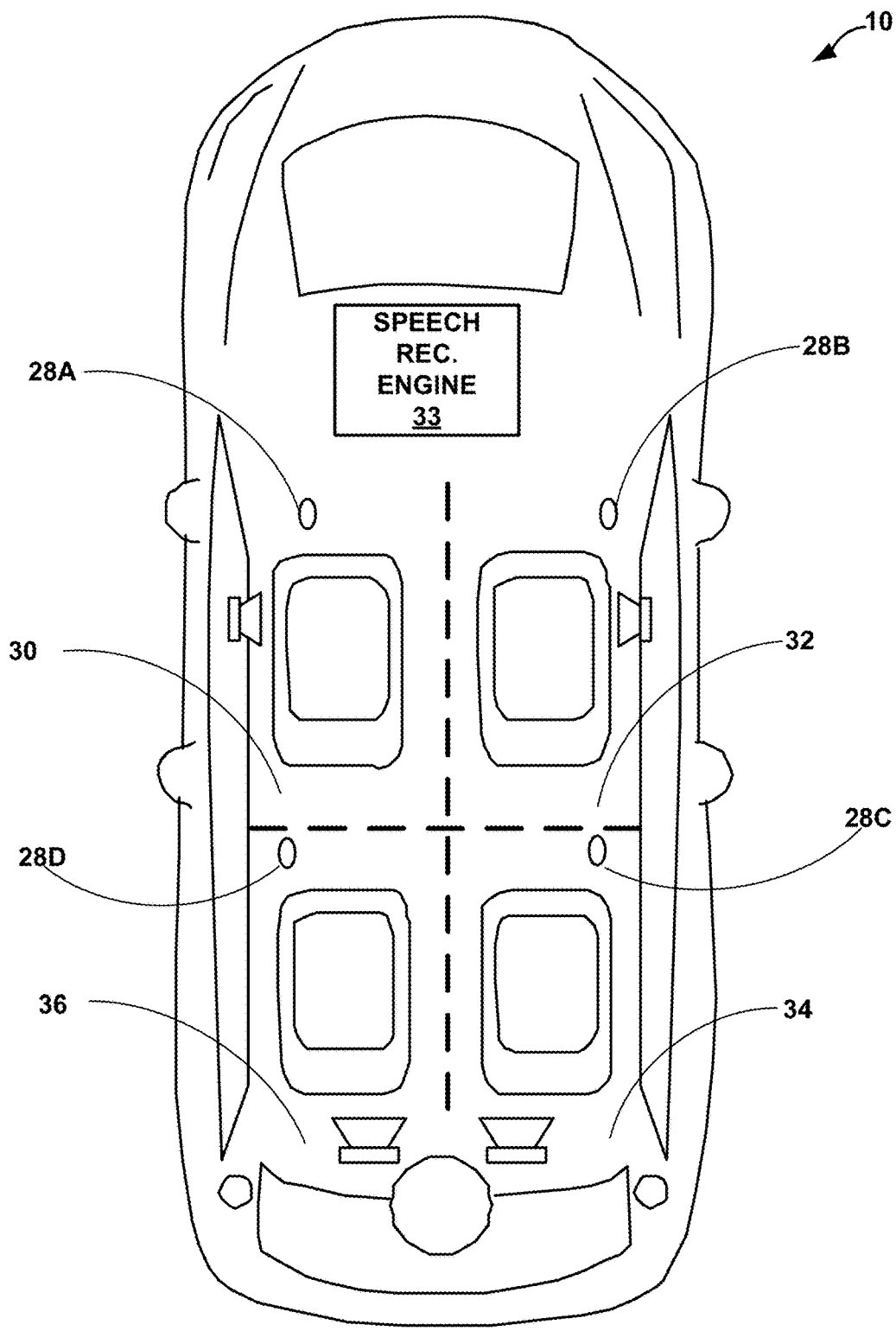

FIG. 2C illustrates an example of the vehicle 60 in which the vehicle includes a speech recognition engine 33. The speech recognition engine 33 may be implemented in circuitry including, but not limited to, one or more digital signal processors (DSPs), general purpose microprocessors, application specific integrated circuits (ASICs), field programmable logic arrays (FPGAs), fixed function circuitry, programmable processing circuitry, any combination of fixed function and programmable processing circuitry, or other equivalent integrated circuitry or discrete logic circuitry. The speech recognition engine 33 may perform functionalities related to robotics and/or computational linguistics, in order to translate audio data received from the zone microphones 28 to command data that can be stored to the command buffer 20. In some examples where the processing circuitry 12 is configured to use a spoken command to select a particular zone of the in-cabin vehicle zones 30-36, the processing circuitry 12 may invoke the speech recognition engine 33 to process data from a spoken command received via the zone microphones 28. For instance, the speech recognition engine 33 may be configured to process, from the audio data of the spoken command, data that the processing circuitry 12 can use to effect a zone selection from among the in-cabin vehicle zones 30-36.

Figure 2D:
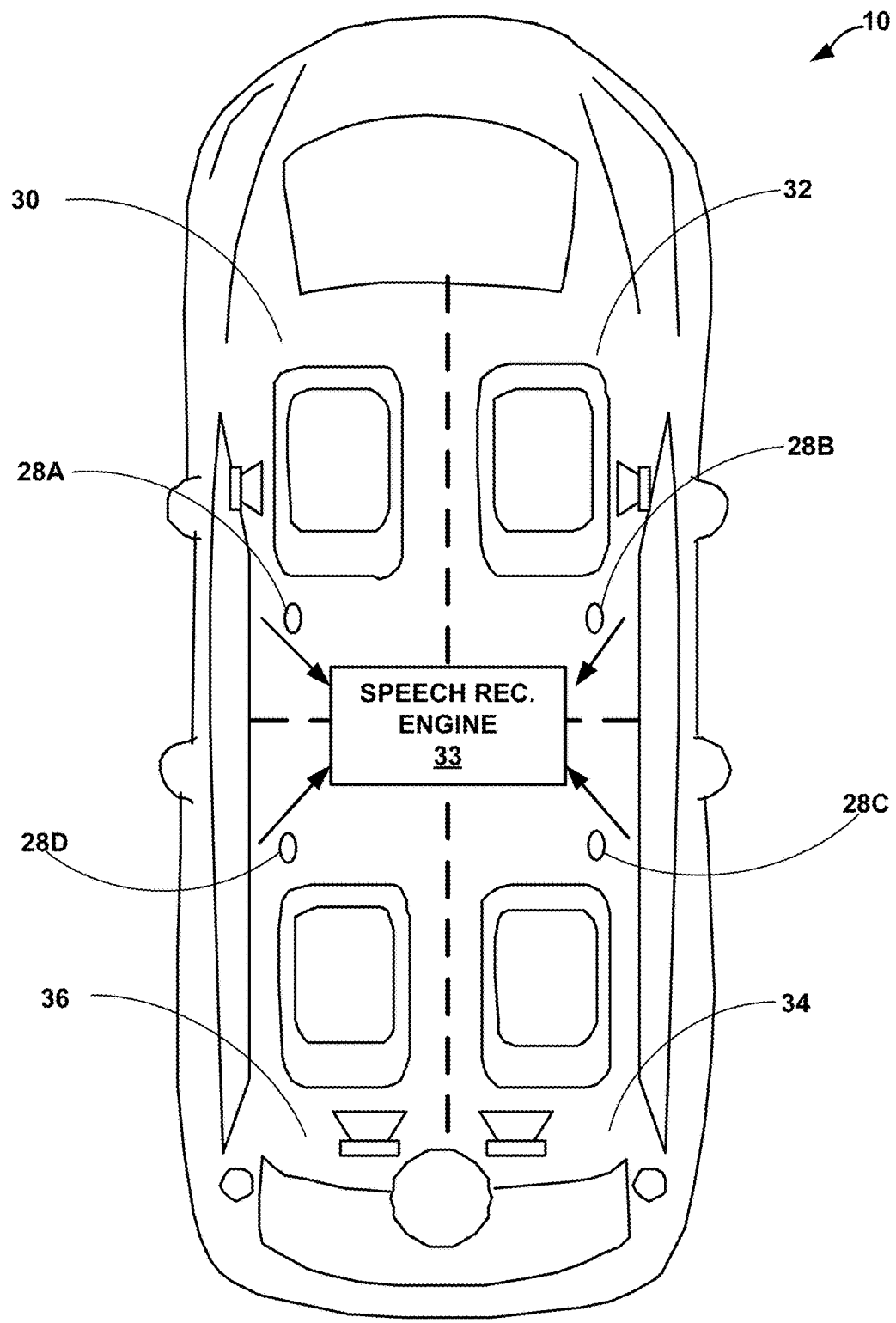

FIG. 2D illustrates an example of the vehicle 10, with communicative connections shown from each zone microphone of the zone microphones 28 to the speech recognition engine 33. It will be appreciated the positions of the zone microphones 28 and the speech recognition engine 33 illustrated in FIGS. 2C and 2D are non-limiting examples, and various positions are possible, consistent with the systems of this disclosure.

Figure 2E:
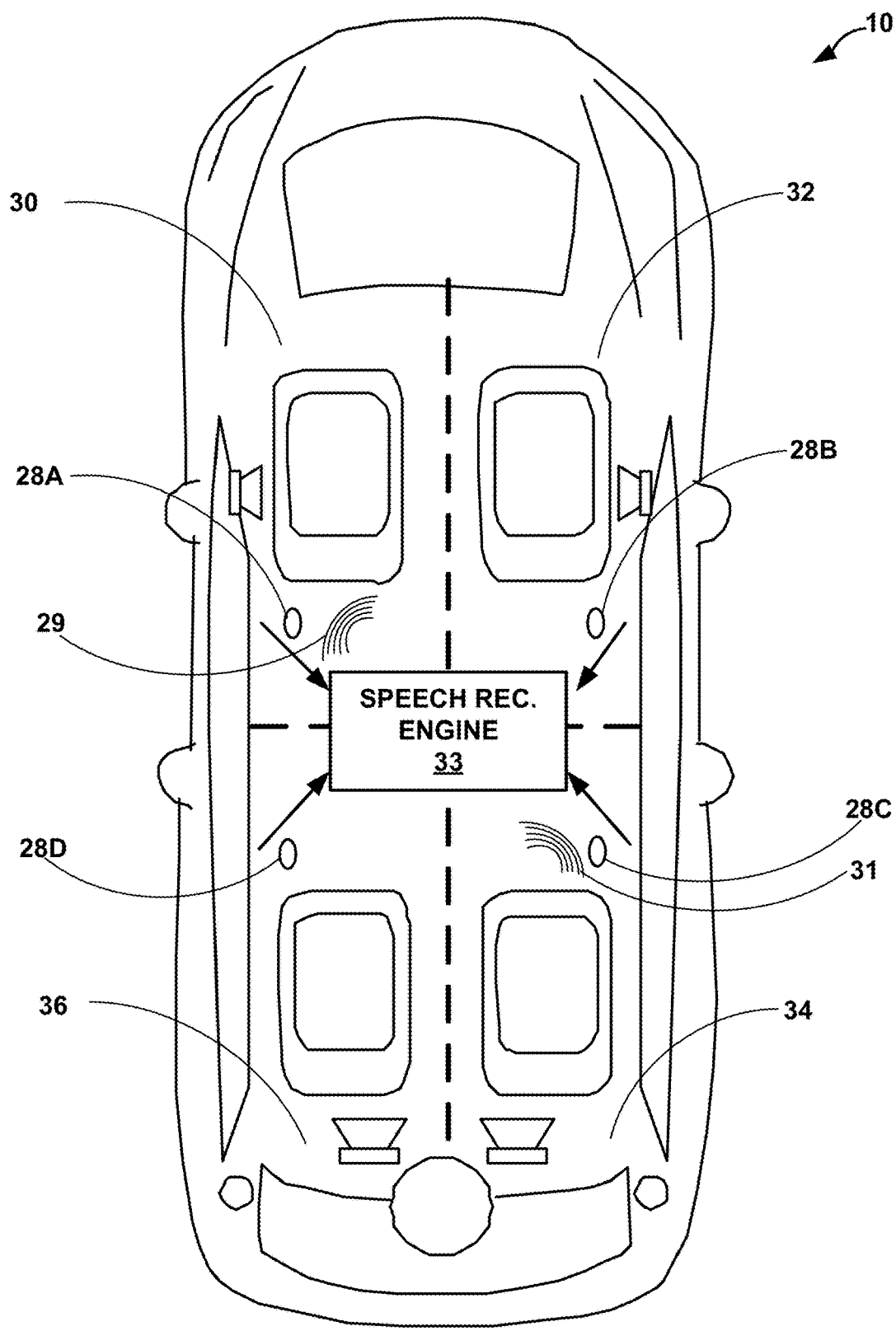

FIG. 2E illustrates an example of the vehicle 10, in which the processing circuitry 12 may process voice commands from multiple in-cabin vehicle zones simultaneously. In the example of FIG. 2E, each of zone microphones 28A and 28C may receive voice commands 29 and 31 simultaneously or concurrently. The processing circuitry 12 may simultaneously use spoken command inputs received from the in-cabin vehicle zone 30 (via the zone microphone 28A) and the in-cabin vehicle zone 34 (via the zone microphone 28C) to control respective functional units in the in-cabin vehicle zone 30 and the in-cabin vehicle zone 34.

As shown in FIGS. 2A-2E, each of in-cabin vehicle zones 30-36 includes at least one loudspeaker. In some examples, each of the in-cabin vehicle zones 30-36 of the vehicle 10 may include an array of loudspeakers along with the regular speakers in the respective in-cabin vehicle zone. The respective loudspeaker arrays positioned in the in-cabin vehicle zones 30-36 may direct and/or play audio data including data of relatively higher frequencies, using a fixed pre-filter to localize the high frequency play back in the respective loudspeaker array's near-field zone. Pre-filtering may include additional signal processing to cancel out any out-of-zone high frequency audio content. In contrast, any regular car-speakers may play relatively lower frequency content audio intended to be audible throughout the entire cabin of the vehicle 10. As used herein, "the entire cabin" of the vehicle 10 may include all of the in-cabin vehicle zones 30-36 in addition to any common areas that may or may not be included in one of the in-cabin vehicle zones 30-36.

In some examples, with multiple loudspeakers positioned in one or more of the in-cabin vehicle zones 30-36, the processing circuitry 12 may implement various techniques of this disclosure to render or otherwise provide auditory responses in a localized fashion within the respective one of the in-cabin vehicle zones 30-36, while enabling passengers in the rest of the cabin of the vehicle 10 to consume uninterrupted audio and/or video data from the infotainment system of the vehicle 10. As one example, the processing circuitry 12 may perform noise masking, by creating a diffused sound field without a detectable sound source. As another example, the processing circuitry 12 may focus the sound in a localized fashion within one of the in-vehicle zones 30-36, or towards any particular (e.g., predetermined) direction. As another example, the processing circuitry 12 may send multiple sound beams in different directions within the cabin of the vehicle 10. In some instances, in which the vehicle 10 is equipped with parametric speakers or with multiple loudspeakers, the processing circuitry 12 may implement one or more of the above-described techniques to render localized playback of auditory responses to the spoken command within the respective one of the in-cabin vehicle zones 30-36, while leaving the rest of the cabin of the vehicle 10 uninterrupted.

In some examples, the processing circuitry 12 may remove background audio data that originated from a phone call (e.g., a passenger speaking on a cellular telephone) that occurs in any of the in-cabin vehicle zones 30-36 that is not, at present, the selected in-cabin vehicle zone. In this way, the processing circuitry 12 may implement the background audio data-removal aspects of this disclosure to process voice commands received from a selected zone of the in-cabin vehicle zones 30-36, without substantive interference or audio garbling caused by a passenger participating in a phone call in another one of the in-cabin vehicle zones 30-36. In some examples, the processing circuitry 12 may remove background audio data that corresponds with multiple phone calls occurring in two or more of the in-cabin vehicle zones 30-36, outside of the selected in-cabin vehicle zone of the in-cabin vehicle zones 30-36.

Figure 3:
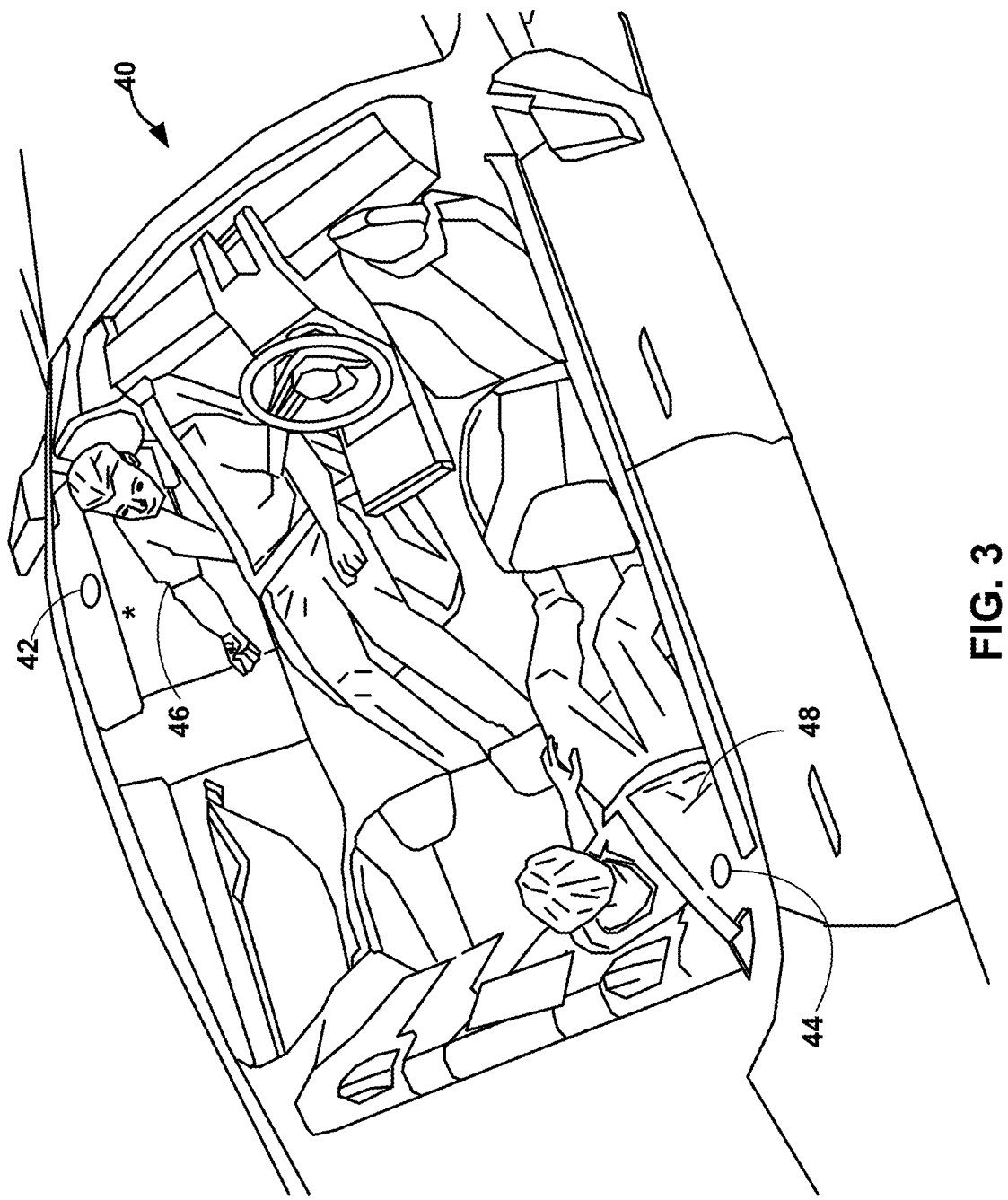
FIG. 3 is a conceptual diagram illustrating an example of a cabin of the vehicle of FIGS. 1 and 2.

FIG. 3 is a conceptual diagram illustrating an example of a cabin 40 of the vehicle 10. In the example of FIG. 3, the vehicle 10 represents an autonomous vehicle, as illustrated by several features, such as the steering wheel being positioned between seats, instead of being positioned directly in front of an individual seat. For ease of illustration purposes only, FIG. 3 illustrates an example in which two occupants 46 and 48 are currently in the cabin 40 of the vehicle 10. However, it will be appreciated that the techniques of this disclosure are also applicable to scenarios in which three, four, or possibly greater than four occupants are in the cabin 40.

In the example of FIG. 3, occupant 46 has voice control over the functional unit(s) 26, based on an "active" status of a microphone 42 positioned in the in-cabin vehicle zone associated with the passenger 46. The active status of the microphone 42 is denoted by an adjacent asterisk in FIG. 3, and as such, the microphone 42 is referred to hereinafter as an active microphone 42. By contrast, the microphone 44 that is positioned in the in-cabin zone in which the occupant 48 is seated is currently inactive, and is referred to herein as an inactive microphone 48. In some implementations, the processing circuitry 12 may transfer voice control to an active microphone, such as by ceasing to control the functional unit(s) 26 using audio input from the inactive microphone 48, and beginning control of the functional unit(s) 26 using the active microphone 46. In other examples, the processing circuitry 12 may maintain control at a single microphone, such as by receiving a command to assign voice control to the active microphone 44, when the active microphone 44 already had active status. In this example, the processing circuitry 12 may continue to control the functional unit(s) 26 using audio input received at the active microphone 46 after receiving the command to assign voice control to the in-cabin vehicle zone that includes the active microphone 46.

In some examples, the processing circuitry 12 may apply noise cancellation at the active microphone 46, to dampen or suppress any unwanted voice commands that may be detected from the occupant 44. For instance, the processing circuitry 12 may implement a learning algorithm with respect to audio data received from the inactive microphone 48, and thereby form voice recognition heuristics with respect to the inactive microphone 48. If the processing circuitry 12 detects audio data received at the active microphone 46 that matches, or substantially matches the voice data associated with the inactive microphone 48, the processing circuitry 12 may identify the audio data matching the voice data of the inactive microphone 48 as noise with respect to the active microphone 46. In some examples, the processing circuitry 12 may implement the learning algorithm with respect to the active microphone 46, and then identify all audio data that does not match the voice information for the active microphone 46 as noise (e.g., voice data detected from the infotainment system of the vehicle 10, voice data detected from a cellular phone that is used on speaker mode, etc.). In turn, the processing circuitry 12 may suppress the identified noise in the audio data received from the active microphone 46, thereby filtering out noise, and using voice commands received from the active microphone 46 to control the functional unit(s) 26.

In some examples, the processing circuitry 12 may amplify any audio data received at the active microphone 46 that matches the voice recognition information associated with the occupant 42. For instance, the processing circuitry 12 may implement beamforming in order to alter a phase and/or an amplitude of the audio inputs (or portions thereof) received from the active microphone 46, the inactive microphone 48, and any other inactive microphones of the zone microphones 28 that are not shown in FIG. 3. In some implementations, the processing circuitry 12 may extend the noise canceling aspects discussed above to both active microphone 42 and inactive microphone 48, as well as any other inactive microphones included in the cabin 40.

In some implementations, each of the zone microphones 28 may have concurrent voice control over functional units that are local to the specific in-cabin vehicle zone in which the respective zone microphone 28 is included. For instance, inactive microphone 44 may have voice control over local climate settings in its in-cabin vehicle zone, even while active microphone 42 has voice control over one or more cabin-wide conditions provided by the functional unit(s) 26.

Figure 4:
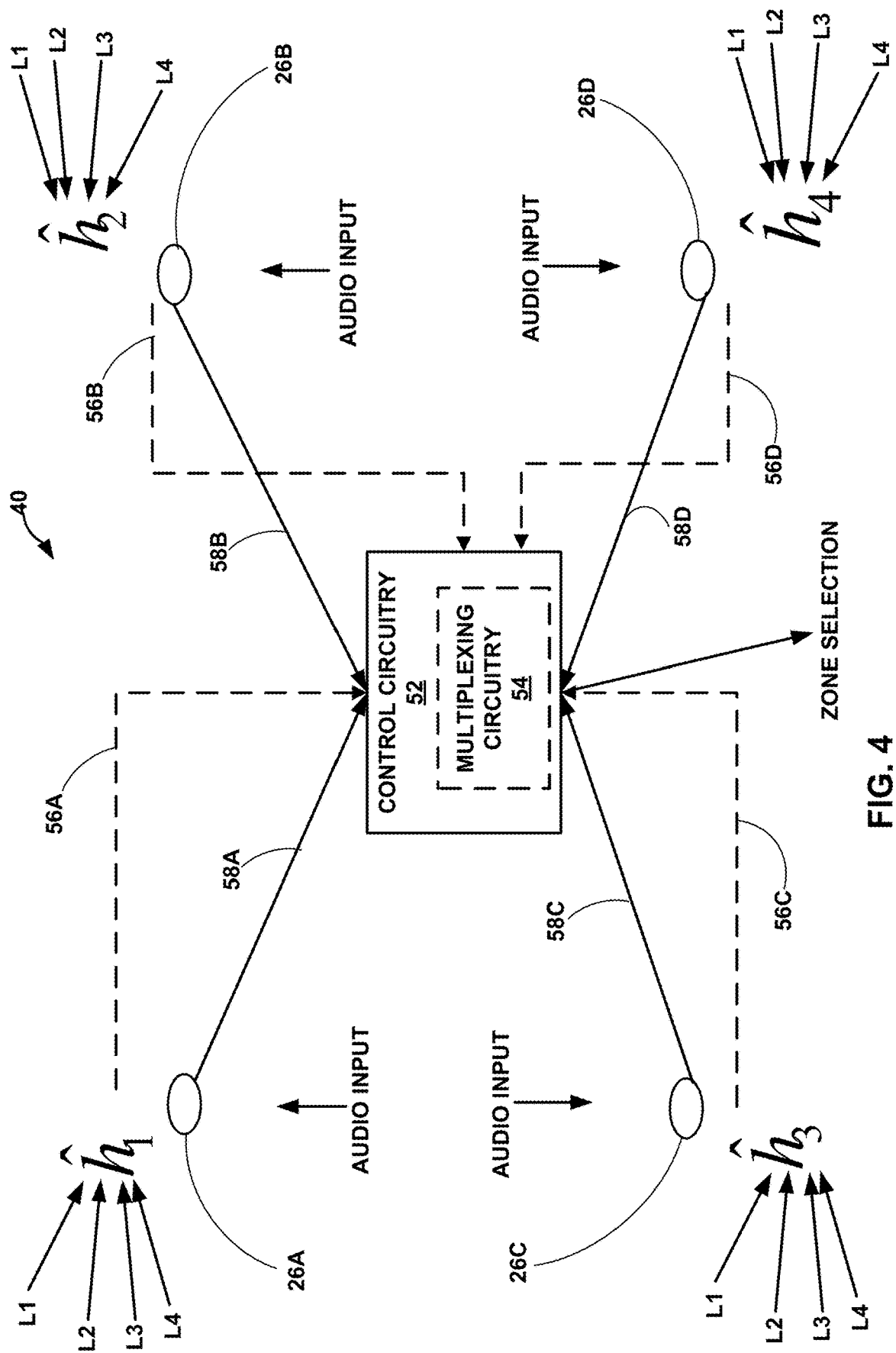
FIG. 4 is a conceptual diagram illustrating the voice command control assignment techniques of this disclosure, as implemented in another example of the cabin of the vehicle.

FIG. 4 is a conceptual diagram illustrating the voice command control assignment techniques of this disclosure, as implemented in another example of the cabin 40 of the vehicle 10. In the example of FIG. 4, the cabin 40 is equipped with four zone microphones 28, which are labeled as zone microphones 28A, 26B, 26C, and 26D. Each of the zone microphones 28 receives four loudspeaker outputs L1-L4, which are emitted by the loudspeakers of the cabin 40. While illustrated as receiving four loudspeaker inputs, it will be appreciated that each of the zone microphones 28 may receive a different number of loudspeaker inputs in cases where the cabin 40 is equipped with a different number of loudspeakers. It will also be appreciated that, at each of the zone microphones 28, the volumes of the loudspeaker outputs L1-L4 may vary in volume, depending on the distance of the respective zone microphone 28 to each of the emitting loudspeakers as positioned within the cabin 40. Each of the zone microphones 28 may implement echo cancellation with respect to the loudspeaker outputs L1-L4, and the echo cancellation functionality is expressed in FIG. 4 using the mathematical expressions $\hat{h}_1$, $\hat{h}_2$, $\hat{h}_3$, and $\hat{h}_4$. Upon applying echo cancellation, each of the zone microphones 28 may provide a respective voice input 58 to the control circuitry 52.

The control circuitry 52 may represent an example of some combination of the processing circuitry 12 and the in-cabin vehicle control unit 14 illustrated in FIG. 1. Optionally, the control circuitry 52 may implement multiplexing circuitry 54. In cases where the control circuitry 52 does not include the multiplexing circuitry 54, the control circuitry 52 may implement some other logic circuitry or combination of gates. Examples of the control circuitry 52 include, but are not limited to, one or more digital signal processors (DSPs), general purpose microprocessors, application specific integrated circuits (ASICs), field programmable logic arrays (FPGAs), fixed function circuitry, programmable processing circuitry, any combination of fixed function and programmable processing circuitry, or other equivalent integrated circuitry or discrete logic circuitry.

The control circuitry 52 may be configured to perform voice recognition with respect to the voice inputs 58 received from the zone microphones 28. For instance, the control circuitry 52 may perform the voice recognition in order to support the adaptive noise cancellation with respect to cross-zone talk as described above with respect to certain examples of this disclosure. Additionally, the control circuitry 52 may receive control inputs 56. The control inputs 56 are shown using dashed-lines to illustrate that the control inputs 56 may, but do not necessarily, originate from the respective zone microphone 28. Rather, each of the control inputs 56 is associated with assigning voice control to the respective in-cabin zone that includes the respective zone microphone 28. As discussed above, each of the control inputs 56 may originate from another one of the zone microphones 28 (e.g., a driver or pilot microphone), from a tactile input provided at a touchscreen positioned in the cabin 40, or from another source.

The multiplexing circuitry 54 may multiplex the control inputs 56 to determine which of the in-cabin zones is to be assigned voice control, by way of its respective zone microphone 28. In the specific example of FIG. 4, the multiplexing circuitry 54 may perform 4:2:1 multiplexing, as the cabin 40 includes four zone microphones 28. In other examples, the multiplexing circuitry 54 may perform a different level of multiplexing, depending on a total number of the zone microphones 28 included in the cabin 40, such as 8:3:1 multiplexing, and so on.

In the example illustrated in FIG. 4, the control circuitry 52 outputs an indication of the zone selection. In various examples, the control circuitry 52 may output the indication of the zone selection in various forms. Examples include electrical signals that the interface device 22 can output in visual format (e.g., via a console), in audible format (e.g., as an announcement or other audio cue output via the loudspeakers positioned in the cabin of the vehicle 10), or any combination thereof. In some examples, the control circuitry 52 may output the indication of the zone selection as electrical signals sent to the functional unit(s) 26. In other examples, the functional unit(s) 26 may be agnostic to the zone selection, and the control circuitry 52 may use the zone selection to operate one or more gates that select which of zone microphones 28 provides audio input that is to be used for controlling the functional unit(s) 26.

As such, in one example, vehicle 10 is a vehicle comprising an interface device 22 configured to receive a spoken command to identify an in-cabin vehicle zone of two or more in-cabin vehicle zones of the vehicle 10, and an in-cabin vehicle control unit 14, coupled to the interface device 22, and being configured to select which in-cabin vehicle zone of the two or more in-cabin vehicle zones is identified by the spoken command. The vehicle 10 may also include one or more functional units 26, coupled to the in-cabin vehicle control unit 14, and being configured to control a function within the vehicle 10. Vehicle 10 also includes processing 12 coupled to the interface device 22, to the in-cabin vehicle control unit 14, and to the functional unit(s) 26. Processing circuitry 12 is configured to store, to the command buffer 20, data processed from a received spoken command, and to control, based on the data processed from the received spoken command, the functional unit(s) 26 using audio input received from the selected in-cabin vehicle zone (e.g., via a respective one of zone microphones 28). The vehicle 10 also includes memory device 16 that includes the command buffer 20.

In some examples, the processing circuitry 12 is further configured to cease controlling the functional unit using audio input received from a deactivated in-cabin vehicle zone of the two or more in-cabin vehicle zones prior to controlling the functional unit using the audio input received from selected in-cabin vehicle zone of the two or more in-cabin vehicle zones, based on the receipt of the spoken command at the interface device. In some examples, the processing circuitry 12 is further configured to control the functional unit using the audio input received from the selected in-cabin vehicle zone prior to the receipt of the spoken command at the interface device, and to continue to control the functional unit using the audio input received from the selected in-cabin vehicle zone after receipt of the spoken command at the interface device.

In some examples, the vehicle 10 further includes a touchscreen integrated as part of the interface device 26, the touchscreen being configured to replace the interface device ability to receive a spoken command, and to receive a tactile input command to identify the in-cabin vehicle zone. In some examples, the vehicle 10 further includes a touchscreen integrated as part of the interface device 26, the touchscreen being configured to augment the interface device 22 ability to receive a spoken command, and to receive a tactile input command to identify the in-cabin vehicle zone. In some examples, the functional unit comprises a thermostat controller configured to control a temperature within the selected in-cabin vehicle zone. In some examples, the functional unit comprises a noise cancellation (NC) system configured to suppress sounds outside of the selected in-cabin vehicle zone. In some examples, the vehicle 10 further comprises loudspeakers integrated as part of the NC system, the loudspeakers being configured to render amplified sounds within the selected in-cabin vehicle zone. For instance, after receiving a command to perform the noise cancellation, the NC system may, within the confines of a single in-cabin vehicle zone, suppress the sound originating from another in-cabin vehicle zone. In one use case example, the NC system may suppress sound originating from the back-left zone 36, using the loudspeaker(s) positioned in the back-right zone 34. For example, if the loudspeaker of the back-left zone 36 outputs a soundfield that the occupant of the back-right zone 34 indicates is to be suppressed, then the NC system may output a noise-canceling signal via the loudspeaker(s) of the back-right zone 34 to suppress the sound emanating from the loudspeaker(s) of the back-left zone 36.

In some examples, the vehicle 10 further comprises a separate microphone array coupled to the functional unit, the separate microphone array being configured to perform audio beamforming within the selected in-cabin vehicle zone. In some examples, at least one microphone of the separate microphone array, is located in the two or more in-cabin vehicle zones, and wherein the at least one microphone is configured to capture the spoken command from one of the two or more in-cabin vehicle zones. In some examples, the vehicle 10 further comprises a steering wheel positioned within a respective in-cabin vehicle zone of the two or more in-cabin vehicle zones, wherein the interface device is positioned in the respective in-cabin vehicle zone in which the steering wheel is positioned.

In some examples, the separate microphone array includes a microphone that functions as both a zone microphone and as an error microphone. The error microphone aspects of the microphone of the array enable the microphone to capture noise data for an active noise cancellation (ANC) system of the vehicle 10. In other examples, the separate microphone array includes both dedicated error microphones (used to capture noise data for the ANC system) and dedicated zone microphones, to capture command inputs (e.g., spoken commands) from the respective zone of the in-cabin vehicle zones 30-36. In examples where the separate microphone array includes dedicated error microphones and dedicated zone microphones, some or all dedicated zone microphones may be configured to capture a combination of audio data and directional information. For instance, the processing circuitry 12 may use the directional information to perform beamforming with respect to the origination location of various spoken commands captured by the dedicated zone microphones.

In some examples, the in-cabin vehicle control unit 14 is configured to select which in-cabin vehicle zone is identified by the spoken command originating in in-cabin vehicle zones of the two or more in-cabin vehicle zones that are positioned behind the respective in-cabin vehicle zone in which the steering wheel is positioned. In some examples, the processing circuitry 12 is further configured to suppress audio input received from respective microphones of all in-cabin vehicle zones other than the selected in-cabin vehicle zone. In some examples, the processing circuitry 12 is further configured to amplify audio input received from a respective microphone of the selected in-cabin vehicle zone.

In some examples, the processing circuitry 12 is further configured to identify respective voice information associated with audio input received from respective microphones of the in-cabin vehicle zones other than the selected in-cabin vehicle zone, to determine that any portion of the audio input that is received from a respective microphone of the selected in-cabin vehicle zone and is associated with the identified voice information received from the respective microphones of the in-cabin vehicle zones other than the selected in-cabin vehicle zone comprises noise with respect to the selected in-cabin vehicle zone, to apply, based on the determination, noise cancellation to the portion of the audio input that comprises the noise with respect to the selected in-cabin vehicle zone to obtain noise-cancelled audio input associated with the selected in-cabin vehicle zone, and to control the functional unit using the noise-cancelled audio input associated with the selected in-cabin vehicle zone. In various examples, the functional unit may include one or more of a climate control system of the vehicle, an entertainment system of the vehicle, an integrated wireless phone link system, or an integrated emergency notification system.

Figure 5:
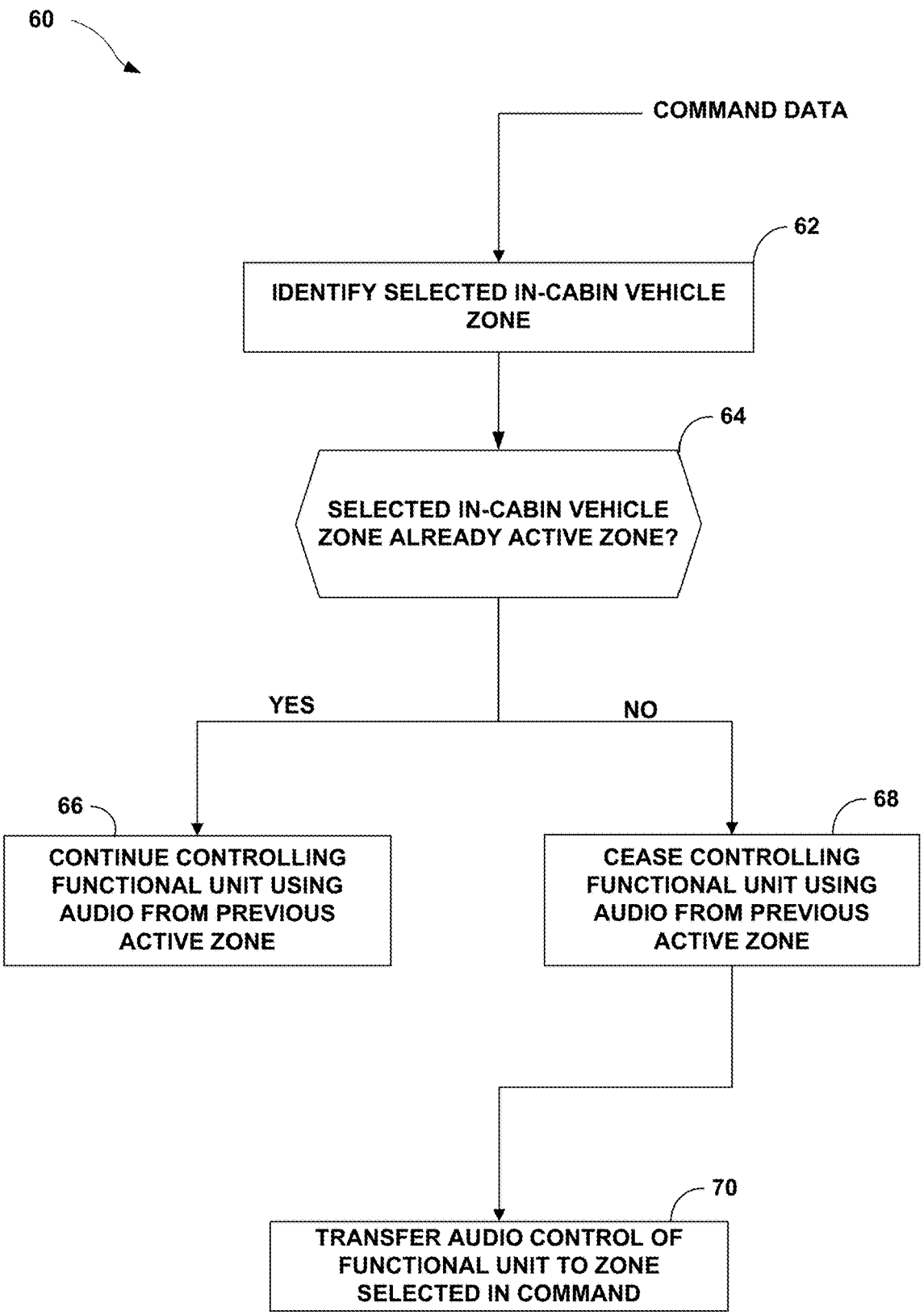
FIG. 5 is a flowchart illustrating an example process by which the processing circuitry of FIG. 1 may perform various techniques of this disclosure.

FIG. 5 is a flowchart illustrating an example process 60 by which the processing circuitry 12 of FIG. 1 may perform various techniques of this disclosure. The process 60 may begin with the processing circuitry 12 receiving command data from the interface device 22. The command data may be a spoken command, or a tactile input, or any combination thereof. Using the command data received from the interface device 22, the processing circuitry 12 may identify a selected in-cabin vehicle zone of the in-cabin vehicle zones 30-36 illustrated in FIGS. 2A-2D (62). In turn, the processing circuitry 12 may determine whether or not the selected in-cabin vehicle zone is already an active zone with respect to controlling the functional unit(s) 26 (decision block 64). If the processing circuitry 12 determines that the selected in-cabin vehicle zone is already the active zone (YES branch of 64), then the processing circuitry 12 may continue controlling the functional unit(s) 26 using audio data from the previous active (i.e., the same) zone (66). However, if the processing circuitry 12 determines that the selected in-cabin vehicle zone is not already the active zone (NO branch of 64), then the processing circuitry 12 may cease controlling the functional unit(s) 26 using audio data received from the respective zone microphone 28 of the previous active zone (68). Upon ceasing controlling the functional unit(s) using the audio data from the previous active zone, the processing circuitry 12 may transfer audio control of the functional unit(s) 26 to the selected in-cabin vehicle zone identified from the command (70). That is, the processing circuitry 12 may then begin controlling the functional unit(s) 26 using audio data received from the respective zone microphone 28 of the selected in-cabin vehicle zone.

Figure 6:
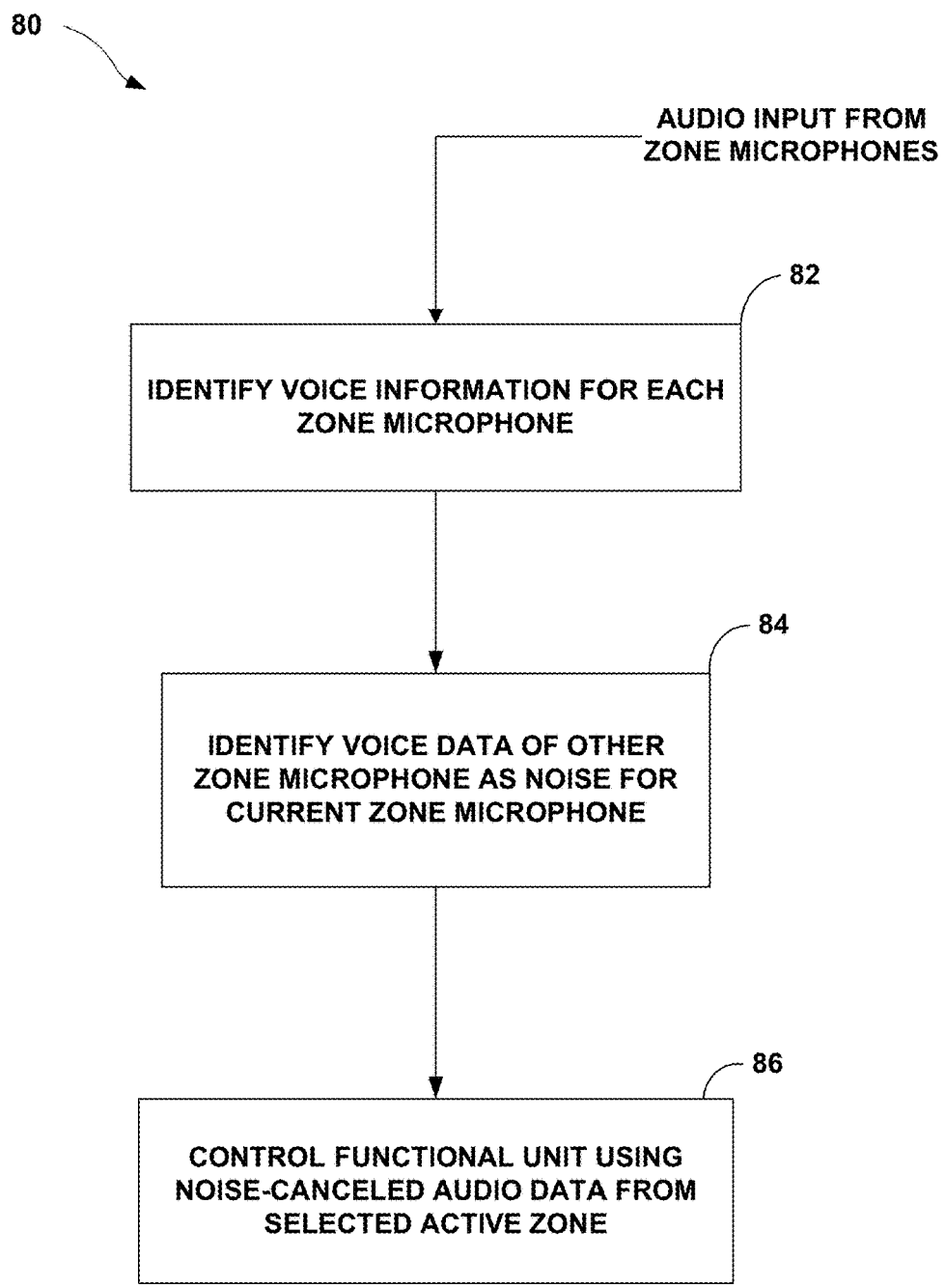
FIG. 6 is a flowchart illustrating another example process by which the processing circuitry of FIG. 1 may perform various techniques of this disclosure.

FIG. 6 is a flowchart illustrating an example process 80 by which by which the processing circuitry 12 of FIG. 1 may perform various techniques of this disclosure. The process 60 may begin with the processing circuitry 12 receiving audio input from the zone microphones 28. Using the example configuration illustrated in FIGS. 2A-2D, the processing circuitry 12 may identify voice information for each of zone microphone 28A, zone microphone 28B, zone microphone 28C, and zone microphone 28D (82).

For instance, the processing circuitry 12 may identify a respective dominant voice for each of the four zone microphones 28. In turn, the processing circuitry 12 may identify, for each of the four zone microphones 28, voice data of other ones of zone microphones 28 as noise. For instance, for the zone microphone 28A, the processing circuitry 12 may identify, as noise, voice data associated with each of zone microphone 28B, zone microphone 28C, and zone microphone 28D (84). The processing circuitry 12 may control the functional unit(s) 26 using the noise-canceled audio data received from the respective zone microphone 28 of the active zone of the in-cabin vehicle zones 30-36 (86). In this way, the processing circuitry 12 may implement the techniques illustrated in FIG. 6 to use spoken commands from the active zone of the vehicle 10 to control the functional unit(s) 26 more effectively, by mitigating or potentially eliminating the effects of in-cabin crosstalk from other occupants.

Figure 7B:
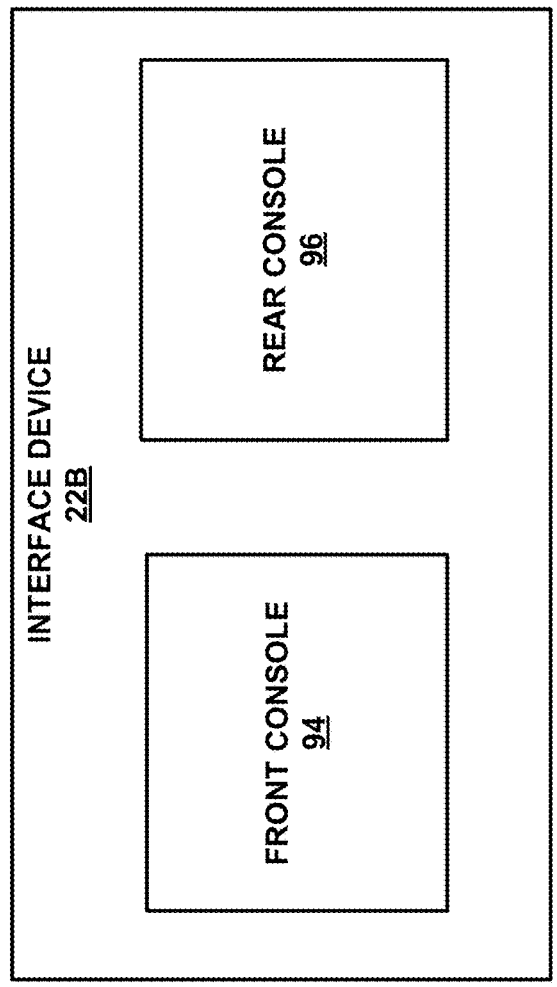
FIGS. 7A-7E are conceptual diagrams illustrating various example implementations of the interface device illustrated in FIG. 1.
Figure 7A:
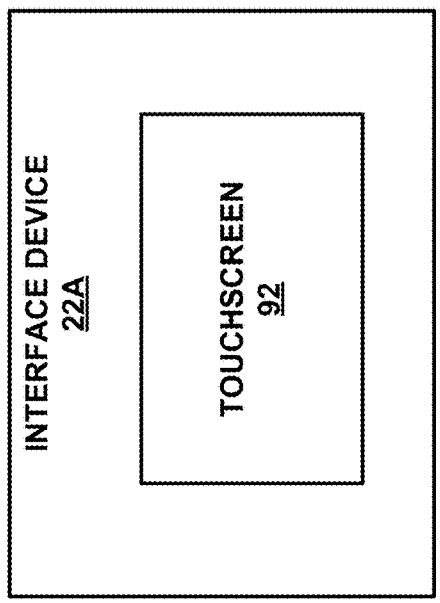

FIGS. 7A-7E are conceptual diagrams illustrating various example implementations of the interface device 22 illustrated in FIG. 1. As shown in FIGS. 7A-7E, the interface device 22 may, in different implementations, be configured to receive, process, and relay different types of user input, from a variety of origination locations with the cabin of the vehicle 10. In the example of FIG. 7A, the interface device 22A includes a touchscreen 92. The touchscreen 92 of the interface device 22A may be positioned at various locations within the cabin of the vehicle 10, such as in the driver zone 30, or in the front-passenger zone 32, or in a common area that is accessible from both the driver zone 30 and the front-passenger zone 32. The touchscreen 92 may enable the interface device 22A to receive tactile input commands, such as from an occupant of the driver zone 30, an occupant of the front-passenger zone 32, or both. For instance, the interface device 22A may receive an input via the touchscreen 92, indicating a particular quadrant of the GUI 31. Based on the location of the tactile input on the touchscreen 92, the processing circuitry 12 may associate the tactile input with a particular quadrant of the GUI 31, and thereby select an in-cabin vehicle zone of the in-cabin vehicle zones 30-36, in accordance with the techniques of this disclosure.

FIG. 7B illustrates an interface device 22B, which includes a front console 94 and a rear console 96. For instance, the location and functionality of the front console 94 may generally correspond to the various possible locations and functionalities described with respect to the touchscreen 92 of FIG. 7A above. The rear console 96 of the interface device 22B may be positioned at various locations within the cabin of the vehicle 10, such as in the back-right zone 34, or in the back-left zone 36, or in a common area that is accessible from both the back-right zone 34 and the back-left zone 36. The rear console 96 may enable the interface device 22B to receive tactile input commands, such as from an occupant of the back-right zone 34, an occupant of the back-left zone 36, or both. For instance, the interface device 22B may receive an input via one or both of the front console 94 or the rear console 96, indicating a particular quadrant of the GUI 31. Based on the location of the tactile input on the respective one of the front console 94 or the rear console 96, the processing circuitry 12 may associate the tactile input with a particular quadrant of the GUI 31, and thereby select an in-cabin vehicle zone of the in-cabin vehicle zones 30-36, in accordance with the techniques of this disclosure.

Figure 7D:
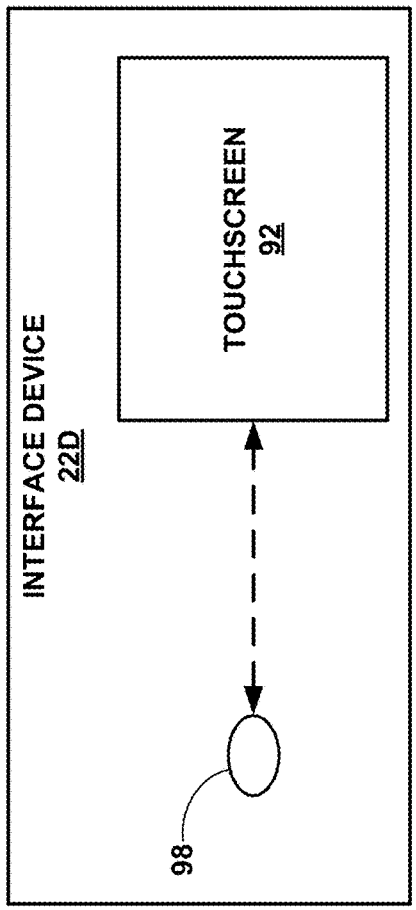
Figure 7C:
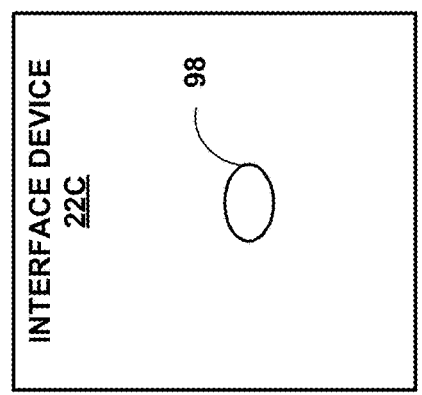

FIG. 7C illustrates an interface device 22C, which includes a microphone array 98. The microphone array 98 may include one or more microphones that are physically distinct from one another, or that are integrated into a single unit. Moreover, in some examples, the interface device 22C may use the microphone array 98 to receive one or more spoken commands from occupants of the cabin of the vehicle 10, and relay the spoken commands to the processing circuitry 12 for selection of an in-cabin vehicle zone of the in-cabin vehicle zones 30-36. The microphone array 98, or portions thereof, may be positioned according to various configurations within the cabin of the vehicle 10. In some examples, the microphone array 98 may be positioned in or within audible proximity of the driver zone 30. In some examples, the microphone array 98 may be positioned in or within audible proximity of the front-passenger zone 32. In some examples, the microphone array may be positioned such that the microphone array can detect spoken commands originating from the driver zone 30 as well as spoken commands originating from the front-passenger zone 32. For instance, the microphone array 98 may cover some respective areas of both the driver zone 30 and the front-passenger zone 32, or may be positioned externally to both the driver zone 30 and the front-passenger zone 32, but in a proximity that enables the microphone array 98 to detect spoken commands originating from both the driver zone 30 and the front-passenger zone 32.

In some examples, the microphone array 98 may include microphones that are positioned within audible range of the back-right zone 34, or the back-left zone 36, or both the back-right zone 34 and the back-left zone 36. For instance, in some such implementations, the microphone array 98 may include or otherwise be coupled to one or both of the zone microphone 28C and/or the zone microphone 28D. In some, but not all, examples where the microphone array 98 includes microphones that are within audible range of the back-right zone 34 and/or the back-left zone 36, the microphone array 98 may also include microphones that are in audible range of the driver zone 30 and/or the front-passenger zone 32. In some such examples, the microphone array 98 may be centrally positioned within the cabin of the vehicle 10, such that the microphone array 98 can detect spoken commands from all four in-cabin vehicle zones 30-36.

As such, the processing circuitry 12 may use the interface device 22C of FIG. 7C to select from in-cabin vehicle zones 30-36, with respect to spoken command-based control of the functional unit(s) 26. In some instances, the processing circuitry 12 may use the interface device 22C to select multiple zones of the in-cabin vehicle zones 30-36 with respect to spoken command-based control of the functional unit(s) 26. That is, in these examples, the processing circuitry may, upon zone selection, control the functional unit(s) 26 using spoken commands received from two or more of the zone microphones 28, based on the two or more zone microphones 28 being positioned in the respective selected zones of the in-cabin vehicle zones 30-36. As one example, based on the control input received via the microphone array 98 of the interface device 22C shown in FIG.

7C, the processing circuitry 12 may simultaneously use spoken command inputs received from two different zones of the in-cabin vehicle zones 30-36 to control the functional unit(s) 26. It will be appreciated that "simultaneously" using spoken command inputs from different zones as used herein may not necessarily imply that two or more spoken commands overlap in speaking time, but rather, that the two or more spoken commands from the different in-cabin vehicle zones may be received via the interface device 22C during a discrete, finite window of time.

FIG. 7D illustrates an interface device 22D, which includes a combination of the microphone array 98 and the touchscreen 92. For instance, the interface device 22D may be configured to receive both tactile input commands and spoken commands, by way of the touchscreen 92 and the microphone array 98, respectively. A logical connection is shown between the microphone array 98 and the touchscreen 92, to illustrate that in some instances, the microphone array 98 and the touchscreen 92 may be in communication with one another. The connection is shown using a dashed-line to indicate that the microphone array 98 and the touchscreen 92 can, but need not necessarily, be in communication with one another. As such, the interface device 22D may be or include an integrated touchscreen-microphone device, or an arrangement in which the touchscreen 92 and the microphone array 98 are physically distinct and in direct connection, or an arrangement in which the touchscreen 92 and the microphone array 98 are physically distinct and in indirect connection.

Figure 7E:
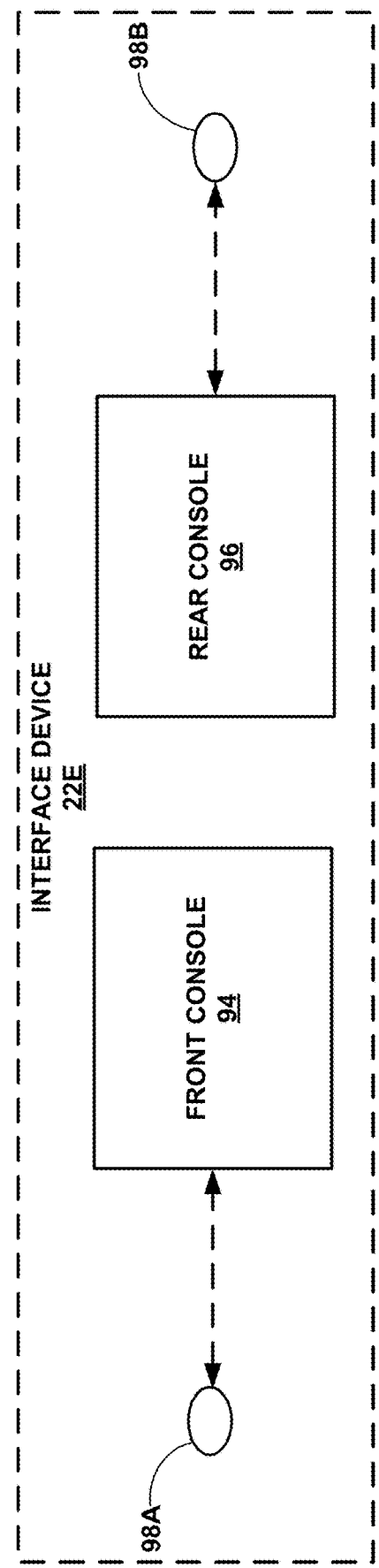

FIG. 7E illustrates an interface device 22E, which includes a combination of a front microphone array 98A, the front console 94, a rear microphone array 98B, and the rear console 96. The communicative connections and interactions between the front microphone array 98A and the front console 94 may generally correspond to the discussion of the microphone array 98 and the touchscreen 92 discussed above with respect to FIG. 7D. The communicative connections and interactions between the rear microphone array 98B and the rear console 96 may generally correspond to the discussion of the microphone array 98 and the touchscreen 92 discussed above with respect to FIG. 7D. Interface device 22E is illustrated with a dashed-line border to indicate that the interface device 22E may include physically distinct components that can be positioned disparately within the cabin of the vehicle 10.

Figure 8:
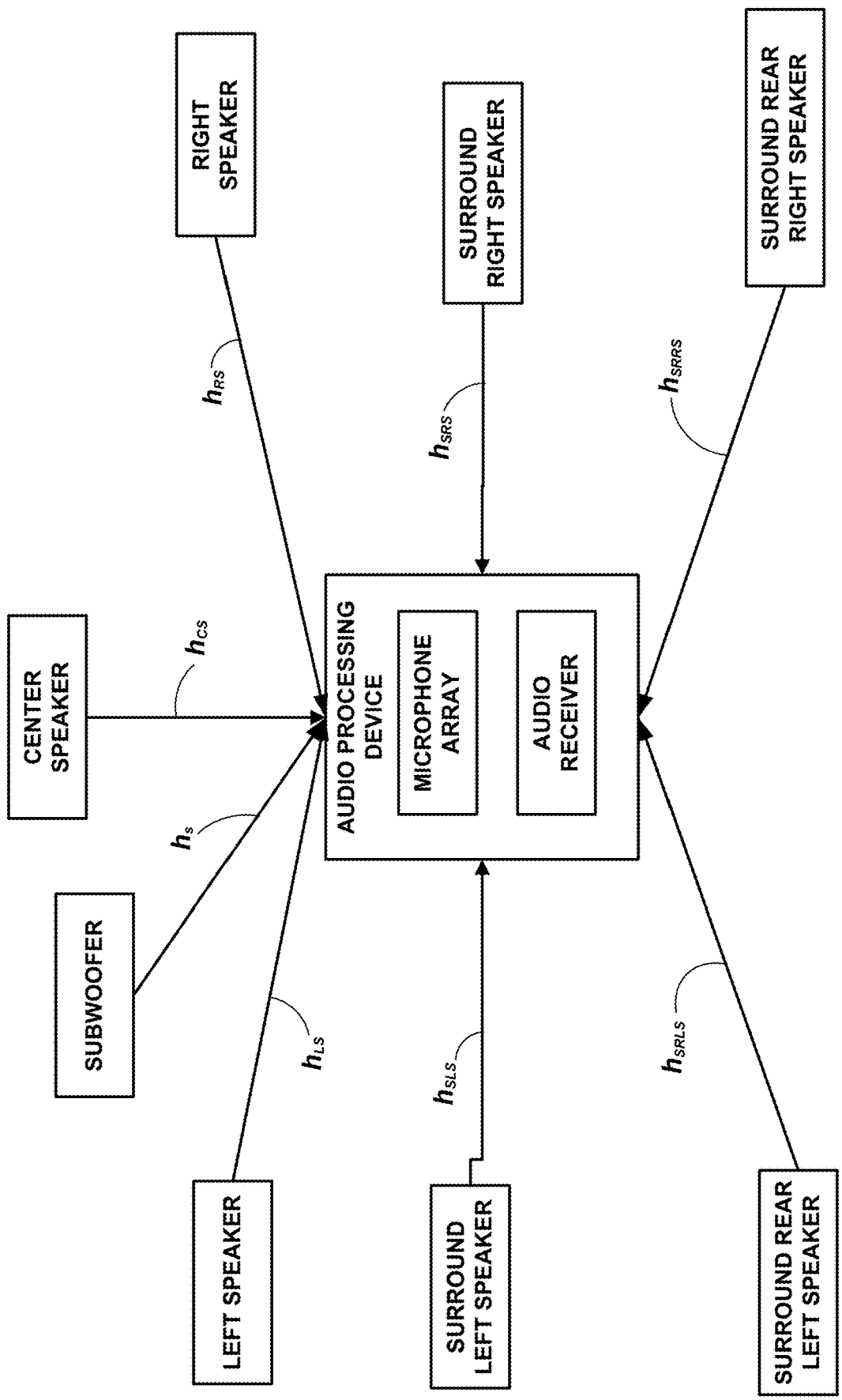
FIG. 8 is a conceptual diagram illustrating respective acoustic paths from various speakers positioned within the cabin of the vehicle 10 to a microphone array (e.g., representing one of zone microphones 28) of an audio processing device.

FIG. 8 is a conceptual diagram illustrating respective acoustic paths from various speakers positioned within the cabin of the vehicle 10 to a microphone array (e.g., representing one of zone microphones 28) of an audio processing device. The audio processing device may also include an audio receiver, which is configured to perform intermediate processing of the audio data received at the microphone array.

The audio processing device may implement the calibration aspects of this disclosure with respect to the directionality information of the various speakers of the vehicle 10 that are illustrated in FIG. 8, by performing a series of steps. As a first step, the audio processing device may detect an echo via the microphone arrays. For instance, each illustrated speaker may potentially contribute towards the echo at the microphone array. As such, the signal played by each in-cabin speaker of FIG. 8 may go through a unique acoustic path, denoted by h with a corresponding speaker-identifying subscript in FIG. 8, before creating an echo at the microphone array.

As a second step of the directionality information calibration techniques, the audio processing device may implement machine-learning of the acoustic paths h from each of the in-cabin speakers using the calibration mode. For example, the audio processing device illustrated in FIG. 8 may cause the illustrated in-cabin speakers, one by one, to output white noise. In this way, the audio processing device illustrated in FIG. 8 may sequentially record speaker-by-speaker reference signals, to detect a speaker-by-speaker echo at the microphone array.

As a third step of the directionality information calibration techniques, the audio processing device illustrated in FIG. 8 may use the white noise recordings offline, using the same csim. For instance, the audio processing device illustrated in FIG. 8 may use a special batch file to generate all of the calibration coefficients with respect to each white noise recording at the microphone array. As a fourth step of the directionality information calibration techniques of this disclosure, the respective zone may store the generated calibration coefficients to the memory device 16 (shown in FIG. 1).

Figure 9:
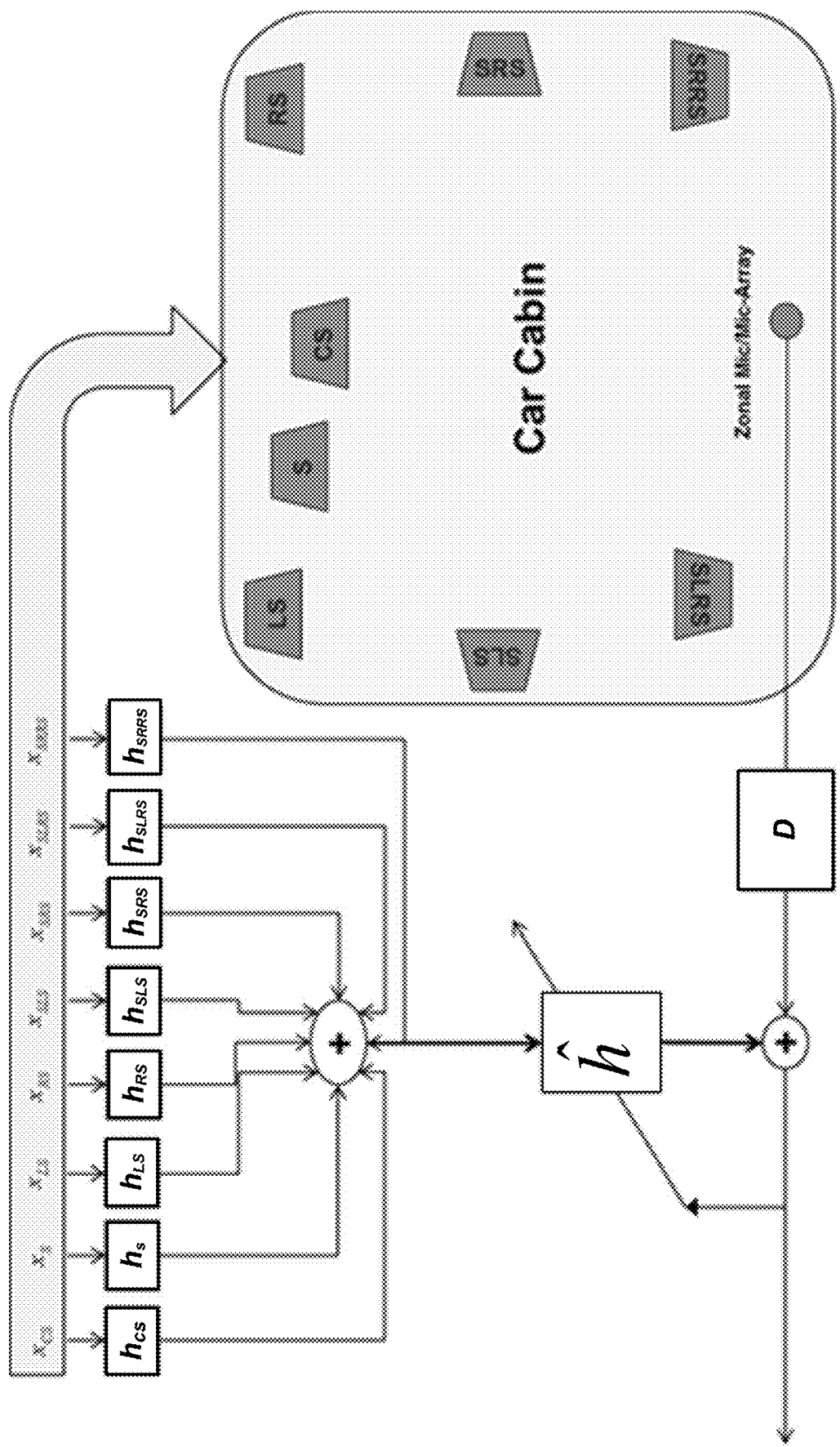
FIG. 9 is a conceptual diagram illustrating echo cancellation aspects of this disclosure.

FIG. 9 is a conceptual diagram illustrating echo cancellation aspects of this disclosure. The audio processing device of FIG. 8 may use the stored calibration coefficients to dynamically create a mono-far-end reference signal, such as by mixing the individual surround signals using the learned acoustic paths h from the calibration mode. The respective zone may further use the generated mono-far-end reference signal and the corresponding microphone signal (with the appropriate delay added) to run echo cancellation and cancel the surround echo.

Figure 10:
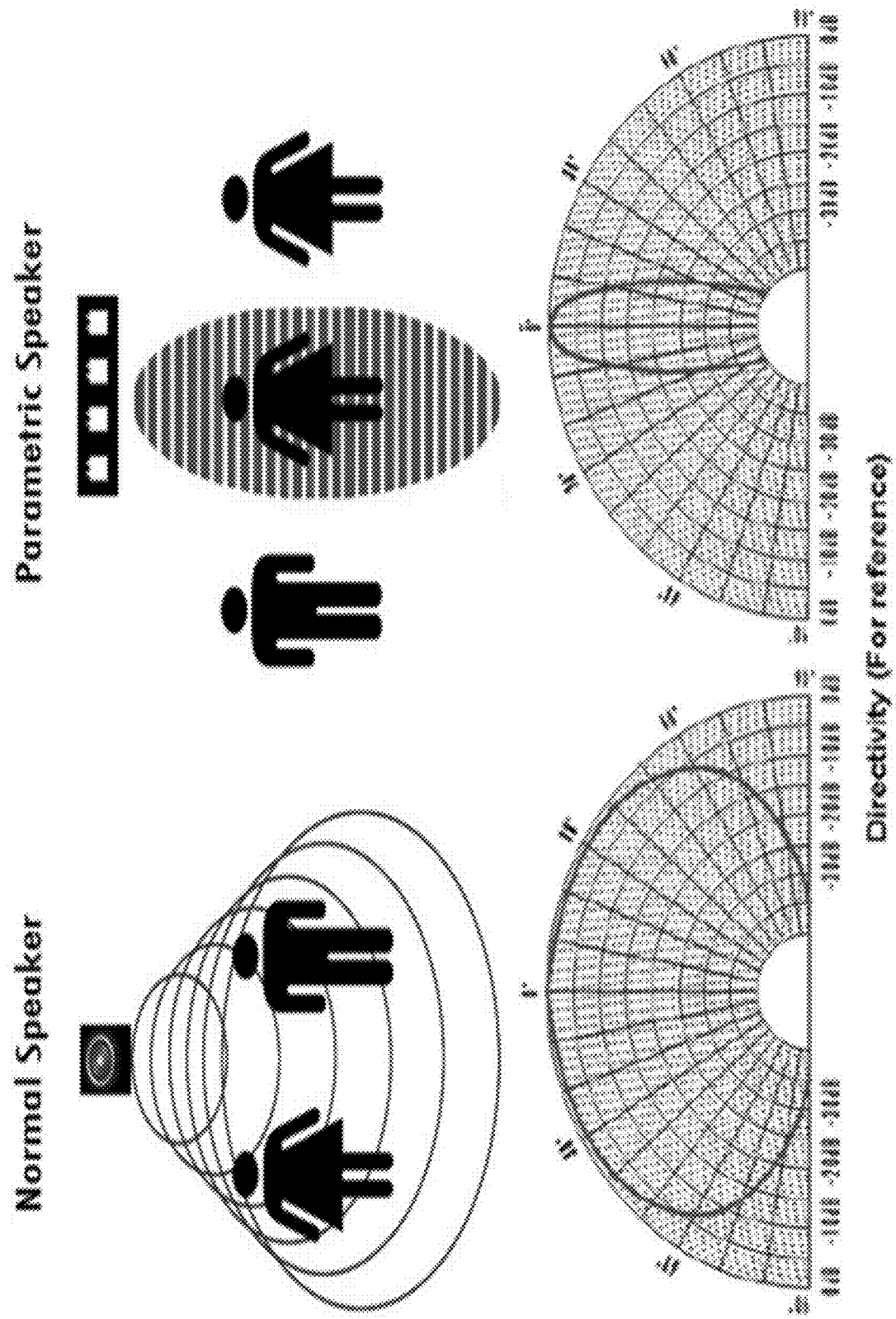
FIG. 10 is a conceptual diagram illustrating the audible range and directivity information of a parametric speaker, as opposed to the audible range and directivity information for a normal speaker.

FIG. 10 is a conceptual diagram illustrating the audible range and directivity information of a parametric speaker, as opposed to the audible range and directivity information for a normal speaker. As discussed above with respect to FIGS. 2A-2D, the vehicle 10 may, in some examples, include a parametric speaker in each of the in-vehicle cabin zones 30-36. As shown, a parametric speaker may render audio data within a more contained audible range than a normal speaker. In some examples, the processing circuitry 12 of the vehicle 10 may generate a response to the spoken command.

In these examples, the processing circuitry 12 may render the response as an auditory response via a respective parametric speaker positioned within the particular in-cabin vehicle zone of the in-cabin vehicle zones 30-36 from which the spoken command was detected. By rendering the auditory response via a parametric speaker positioned within the particular in-cabin vehicle zone, the processing circuitry 12 may implement the techniques of this disclosure to provide an auditory response that is audible to the particular passenger who provided the spoken command, while enabling any remaining passengers in the rest of the cabin of the vehicle 10 to consume uninterrupted audio and/or video data from the infotainment system of the vehicle 10.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). The techniques of this disclosure may be implemented in a wide variety of circuitry, such as discrete logic circuitry, or processing circuitry, such as fixed function circuitry, programmable processing circuitry, or any combination of fixed function circuitry and programmable processing circuitry. Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A vehicle comprising:
a first active noise cancellation (ANC) system within a first in-cabin-vehicle zone that includes:
a first set of one or more microphones located in the first in-cabin-vehicle zone;
a first error microphone, among the first set of one or more microphones in the first in-cabin-vehicle zone, configured to receive a first error signal;
a first set of one or more loudspeakers located in the first in-cabin-vehicle zone, a first loudspeaker, among the first set of one or more loudspeakers in the first in-cabin-vehicle zone, configured to output a first noise cancelled audio signal, wherein the first noise canceled audio signal is a representation of suppressed audio located outside of the first in-cabin-vehicle zone;
a second active noise cancellation (ANC) system within a second in-cabin-vehicle zone that includes:
a second set of one or more microphones located in the second in-cabin-vehicle zone;
a second error microphone, among the second set of one or more microphones in the second in-cabin-vehicle zone, configured to receive a second error signal;
a second set of one or more loudspeakers located in the second in-cabin-vehicle zone, wherein a second loudspeaker among the one or more loudspeakers in the second in-cabin-vehicle zone configured to output a second noise cancelled audio signal, wherein the second noise canceled audio signal is a representation of suppressed audio located outside of the second in-cabin-vehicle zone; and
an in-cabin vehicle control unit, integrated into processing circuitry, configured to:
detect a first assignment of voice control of a first functional unit located in the first in-cabin-vehicle zone;
process the first error signal to produce the first noise cancelled audio signal;
detect a second assignment of voice control of a second functional unit located in the second in-cabin-vehicle zone;
process the second error signal to produce a second noise cancelled audio signal concurrent to processing the first error signal to produce the first noise cancelled audio signal, and
detect concurrent voice control based on (a) the first assignment of voice control of the first functional unit located in the first in-cabin-vehicle zone and (b) the second assignment of the voice control of the second functional unit located in the second in-cabin-vehicle zone and perform concurrent ANC based on (c) the first ANC system within the first in-cabin-vehicle zone and (d) the second ANC system within the second in-cabin-vehicle zone,
wherein processing circuitry includes control circuitry configured to output an indication of a zone selection,
wherein the zone selection indicates an active zone in which an occupant has voice control over one or more cabin-wide conditions controlled by a functional unit outside of one or more of the first in-cabin-vehicle zone and the second in-cabin-vehicle zone,
wherein the zone selection is identified by a spoken command that originates in the second in-cabin vehicle zone and the second in-cabin-vehicle zone is not the active zone, and
wherein the processing circuitry is configured to: (1) determine that the zone selection of the second in-cabin-vehicle zone is not the active zone, (2) cease control of the one or more cabin-wide conditions based on a spoken command spoken by an occupant in the first in-cabin-vehicle zone, and (3) transfer the voice control of the one or more cabin wide conditions based on the spoken command that originated in the second in-cabin vehicle zone.

2. The vehicle of claim 1, wherein the first functional unit located in the first in-cabin-vehicle zone is the active zone.

3. The vehicle of claim 2, wherein the concurrent voice control detection allows for a spoken command from a first occupant located in the first in-cabin-vehicle zone to control the first functional unit while a second occupant located in another in-cabin-vehicle zone that is not active to control the second functional unit with a spoken command from the second occupant in the another in-cabin-vehicle zone.

4. The vehicle of claim 3, wherein in-cabin crosstalk from the second occupant located in the another in-cabin-vehicle zone is associated with the second occupant speaking on a cellular telephone in the second in-cabin vehicle zone, wherein the second in-cabin-vehicle zone is the another cabin-vehicle zone, and wherein the first noise canceled audio signal that is the representation of the suppressed audio located outside of the first in-cabin-vehicle zone is the in-cabin crosstalk.

5. The vehicle of claim 4, wherein the in-cabin crosstalk from the occupant located in the another in-cabin-vehicle zone is from a third occupant speaking on a different cellular telephone in a third in-cabin-vehicle zone, wherein the third in-cabin-vehicle zone is the another in-cabin-vehicle zone.

6. The vehicle of claim 2, wherein the concurrent voice control in the first in-cabin-vehicle zone includes voice control over the one or more cabin-wide conditions.

7. The vehicle of claim 2, wherein the concurrent voice control in the second in-cabin-vehicle zone includes voice control over only the second functional unit located in the second in-cabin-vehicle zone, wherein the second in-cabin-vehicle zone is not the active zone.

8. The vehicle of claim 7, wherein the second functional unit is configured to control climate settings in the second in-cabin-vehicle zone.

9. The vehicle of claim 2, further comprising the first set of one or more microphones in the first in-cabin-vehicle zone, coupled to the processing circuitry, configured to receive a spoken command and background audio in the first in-cabin-vehicle zone.

10. The vehicle of claim 9, wherein the first set of one or more microphones includes two or more microphones, coupled to the processing circuitry, wherein the processing circuitry is configured to audio beamform, based on outputs from the two or more microphones that include the spoken command and the background audio, and isolate the spoken command from the background audio in the first in-cabin-vehicle zone.

11. The vehicle of claim 2, further comprising the first set of one or more microphones that include the first error microphone configured to capture the first noise canceled audio signal for the first ANC system within the first in-cabin-vehicle zone.

12. The vehicle of claim 2, further comprising the first loudspeaker configured to produce the first noise canceled audio signal in the first in-cabin-vehicle zone.

13. The vehicle of claim 2, further comprising a touchscreen that includes a graphical user interface (GUI), wherein the zone selection is based on tactile input on the GUI of the touchscreen.

14. The vehicle of claim 13, wherein the tactile input is a touch or a tap gesture.

15. The vehicle of claim 1, wherein the processing circuitry is configured to determine that the second in-cabin-vehicle zone is a new active zone after the transfer of the voice control of the cabin wide conditions based on the spoken command that originated in the second in-cabin-vehicle zone.

16. A method, performed by processing circuitry, in a vehicle comprising:
   detecting a first assignment of voice control of a first functional unit located in a first in-cabin-vehicle zone among two or more in-cabin vehicle zones, wherein the first in-cabin-vehicle zone includes a first set of one or more microphones and a first set of one or more loudspeakers;
   receiving a first error signal from a first error microphone among the first set of one or more microphones in the first in-cabin-vehicle zone;
   processing the first error signal to produce a first noise canceled audio signal;
   outputting, by a first loudspeaker among the first set of one or more loudspeakers, the first noise canceled audio signal in the first in-cabin-vehicle zone, wherein the first noise canceled audio signal is a representation of suppressed audio located outside of the first in-cabin-vehicle zone, and wherein the first error microphone and the first loudspeaker are part of a first active noise cancellation (ANC) system within the first in-cabin-vehicle zone;
   detecting a second assignment of voice control of a second functional unit located in a second in-cabin-vehicle zone among the two or more in-cabin vehicle zones, wherein the second in-cabin-vehicle zone includes a second set of one or more microphones and a second set of one or more loudspeakers;
   receiving a second error signal from a second error microphone among the second set of one or more microphones in the second in-cabin-vehicle zone;
   processing the second error signal to produce a second noise canceled audio signal concurrent to processing the first error signal to produce the first noise canceled audio signal;
   outputting, by a second loudspeaker among the one or more loudspeakers in the second in-cabin-vehicle zone, the second noise canceled audio signal, wherein the second noise canceled audio signal is a representation of suppressed audio located outside of the second in-cabin-vehicle zone, and wherein the second error microphone and the second loudspeaker are part of a second active noise cancellation (ANC) system within the second in-cabin-vehicle zone; and
   detecting concurrent voice control based on (a) the first assignment of voice control of the first functional unit located in the first in-cabin-vehicle zone and (b) the second assignment of the voice control of the second functional unit located in the second in-cabin-vehicle zone and perform concurrent ANC based on (c) the first ANC system within the first in-cabin-vehicle zone and (d) the second ANC system within the second in-cabin-vehicle zone;
   outputting an indication of a zone selection, wherein the zone selection indicates an active zone in which an occupant has voice control over one or more cabin-wide conditions controlled by a functional unit outside of one or more of the first in-cabin-vehicle zone and the second in-cabin-vehicle zone, wherein the zone selection is identified by a spoken command that originates in the second in-cabin vehicle zone and the second in-cabin-vehicle zone is not the active zone;
   determining that the zone selection of the second in-cabin-vehicle zone is not the active zone;
   ceasing control of the one or more cabin-wide conditions based on a spoken command spoken by an occupant in the first in-cabin-vehicle zone; and
   transferring the voice control of the one or more cabin wide conditions based on the spoken command that originated in the second in-cabin vehicle zone.

17. The method of claim 16, wherein the first functional unit located in the first in-cabin-vehicle zone is the active zone.

18. The method of claim 17, wherein the concurrent voice control detection allows for a spoken command from a first occupant located in the first in-cabin-vehicle zone to control the first functional unit while a second occupant located in another in-cabin-vehicle zone that is not active to control the second functional unit with a spoken command from the second occupant in the another in-cabin-vehicle zone.

19. The method of claim 18, wherein in-cabin crosstalk from the second occupant located in the another in-cabin-vehicle zone is associated with the second occupant speaking on a cellular telephone in the second in-cabin-vehicle zone, wherein the second in-cabin-vehicle zone is the another in-cabin-vehicle zone, and wherein the first noise canceled audio signal that is a representation of suppressed audio located outside of the first in-cabin-vehicle zone is the in-cabin crosstalk.

20. The method of claim 19, wherein the in-cabin crosstalk from the occupant located in the another in-cabin-vehicle zone is from a third occupant speaking on a different cellular telephone in a third in-cabin-vehicle zone, wherein the third in-cabin-vehicle zone is the another in-cabin-vehicle zone.

21. The method of claim 17, wherein the concurrent voice control in the first in-cabin-vehicle zone includes voice control over the one or more cabin-wide conditions.

22. The method of claim 17, wherein the concurrent voice control in the second in-cabin-vehicle zone includes voice control over only the second functional unit located in the second in-cabin-vehicle zone, wherein the second in-cabin-vehicle zone is not the active zone.

23. The method of claim 22, wherein the second functional unit is configured to control climate settings in the second in-cabin-vehicle zone.

24. A non-transitory computer-readable storage medium having instructions stored thereon that, when executed, cause one or more processors to:
  detect a first assignment of voice control of a first functional unit located in a first in-cabin-vehicle zone among two or more in-cabin vehicle zones, wherein the first in-cabin-vehicle zone includes a first set of one or more microphones and a first set of one or more loudspeakers;
  receive a first error signal from a first error microphone among the first set of one or more microphones in the first in-cabin-vehicle zone;
  process the first error signal to produce a first noise canceled audio signal;
  output to a first loudspeaker among the first set of one or more loudspeakers in the first in-cabin-vehicle zone the first noise canceled audio signal, wherein the first noise canceled audio signal is a representation of suppressed audio located outside of the first in-cabin-vehicle zone, and wherein the first error microphone and the first loudspeaker are part of a first active noise cancellation (ANC) system within the first in-cabin-vehicle zone;
  detect a second assignment of voice control of a second functional unit located in a second in-cabin-vehicle zone among the two or more in-cabin vehicle zones, wherein the second in-cabin-vehicle zone includes a second set of one or more microphones and a second set of one or more loudspeakers;
  receive a second error signal from a second error microphone among the second set of one or more microphones in the second in-cabin-vehicle zone;
  process the second error signal to produce a second noise canceled audio signal;
  output to a second loudspeaker among the one or more loudspeakers in the second in-cabin-vehicle zone the second noise canceled audio signal, wherein the second noise canceled audio signal is a representation of suppressed audio located outside of the second in-cabin-vehicle zone, and wherein the second error microphone and the second loudspeaker are part of a second active noise cancellation (ANC) system within the second in-cabin-vehicle zone; and
  detect concurrent voice control based on (a) the first assignment of voice control of the first functional unit located in the first in-cabin-vehicle zone and (b) the second assignment of the voice control of the second functional unit located in the second in-cabin-vehicle zone and perform concurrent ANC based on (c) the first ANC system within the first in-cabin-vehicle zone and (d) the second ANC system within the second in-cabin-vehicle zone;
  output an indication of a zone selection, wherein the zone selection indicates an active zone in which an occupant has voice control over one or more cabin-wide conditions controlled by a functional unit outside of one or more of the first in-cabin-vehicle zone and the second in-cabin-vehicle zone, wherein the zone selection is identified by a spoken command that originates in the second in-cabin vehicle zone and the second in-cabin-vehicle zone is not the active zone;
  determine that the zone selection of the second in-cabin-vehicle zone is not the active zone;
  cease control of the one or more cabin-wide conditions based on a spoken command spoken by an occupant in the first in-cabin-vehicle zone; and
  transfer the voice control of the one or more cabin wide conditions based on the spoken command that originated in the second in-cabin vehicle zone.

* * * * *